(12) United States Patent
Hayashi et al.

(10) Patent No.: US 7,656,769 B2
(45) Date of Patent: Feb. 2, 2010

(54) OPTICAL PICKUP AND OBJECTIVE OPTICAL SYSTEM FOR USE IN THE SAME

(75) Inventors: Katsuhiko Hayashi, Osaka (JP); Akihiro Arai, Kyoto (JP); Yasuhiro Tanaka, Hyogo (JP); Michihiro Yamagata, Osaka (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 11/631,953

(22) PCT Filed: Feb. 17, 2006

(86) PCT No.: PCT/JP2006/302891

§ 371 (c)(1),
(2), (4) Date: Jan. 9, 2007

(87) PCT Pub. No.: WO2006/090653

PCT Pub. Date: Aug. 31, 2006

(65) Prior Publication Data

US 2009/0022039 A1    Jan. 22, 2009

(30) Foreign Application Priority Data

Feb. 25, 2005   (JP) ............................. 2005-051453

(51) Int. Cl.
    *G11B 7/135* (2006.01)
(52) U.S. Cl. ............................. 369/112.07; 369/112.01
(58) Field of Classification Search ........................ None
    See application file for complete search history.

(56) References Cited

U.S. PATENT DOCUMENTS

| | | | |
|---|---|---|---|
| 5,748,603 A | 5/1998 | Kim et al. | |
| 5,748,604 A | 5/1998 | Flender | |
| 5,936,924 A | 8/1999 | Tanaka | |
| 6,515,808 B2 * | 2/2003 | Saito | 359/721 |
| 6,807,019 B2 * | 10/2004 | Takeuchi et al. | 359/742 |
| 6,819,504 B2 * | 11/2004 | Maruyama | 359/719 |
| 6,853,614 B2 | 2/2005 | Kim et al. | |
| 2004/0130804 A1 | 7/2004 | Mimori | |
| 2004/0264348 A1 | 12/2004 | Mimori | |

(Continued)

FOREIGN PATENT DOCUMENTS

JP    11-007653    1/1999

(Continued)

*Primary Examiner*—Joseph H Feild
*Assistant Examiner*—Tawfik Goma
(74) *Attorney, Agent, or Firm*—McDermott Will & Emery LLP

(57) ABSTRACT

An optical pickup (1) includes a light source (6) capable of emitting laser beams of various wavelengths and an objective optical system (2). The objective optical system (2) includes at least two wavefront conversion surfaces (13a) and (16a) and an objective lens (10). The at least two wavefront conversion surfaces (13a) and (16a) convert a wavefront of any laser beam entered therein into a different wavefront in response to the kind of an optical information recording medium (3) corresponding to the laser light. The objective lens (10) focuses the laser beam came out of the wavefront conversion surface (16a) on an optical information recording surface (3R). The optical pickup (1) satisfies the following condition for every wavelength of the corresponding laser beams:

$$|SC_{MAX}| < 0.036 \qquad (1)$$

wherein $SC_{MAX}$ is the maximum value of an offence against the sine condition of the objective optical system (2).

10 Claims, 20 Drawing Sheets

U.S. PATENT DOCUMENTS

2005/0281172 A1 * 12/2005 Wachi .................. 369/112.23

FOREIGN PATENT DOCUMENTS

| JP | 2002-056560 | 2/2002 |
|---|---|---|
| JP | 2002-319172 | 10/2002 |
| JP | 2003-149443 | 5/2003 |
| JP | 2004-219977 | 8/2004 |
| JP | 2004-219978 | 8/2004 |
| JP | 2004-253106 | 9/2004 |
| JP | 2005-011466 | 1/2005 |
| JP | 2005-038585 | 2/2005 |
| WO | WO 2004/012188 A1 | 2/2004 |

* cited by examiner

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

SPHERICAL ABERRATION (mm)

SINE CONDITION (mm)

OPTICAL PICKUP AND OBJECTIVE OPTICAL SYSTEM FOR USE IN THE SAME

RELATED APPLICATIONS

This application is a national phase of PCT/JP2006/302891 filed Feb. 17, 2006, which claims priority from Japanese Application No. 2005-051453 filed Feb. 25, 2005, the disclosures of which Applications are incorporated by reference herein. The benefit of the filing and priority dates of the International and Japanese Applications is respectfully requested.

TECHNICAL FIELD

The present invention relates to an optical pickup and an objective optical system for use in the same.

BACKGROUND ART

In recent years, there has been a growing demand for optical information recording/reproducing devices capable of recording/reproducing information on/from two or more of different kinds of optical information recording media based on different standards, such as CD (Compact Disc), DVD (Digital Versatile Disc), EVD (Enhanced Versatile Disc), BD (Blu-ray Disc) and HD-DVD (High Definition Digital Versatile Disc).

In general, different kinds of optical information recording media are different in specification, such as the wavelength of light used and the thickness of a cover layer of the optical information recording medium (a distance from its surface to the information recording surface of the medium). Therefore, if an objective lens specifically engineered for a certain kind of optical information recording medium is used for a different kind of optical information recording medium, significant aberration (i.e., spherical aberration and the like) occurs. As a result, information cannot be suitably recorded and reproduced on and from the optical information recording medium.

For example, in order to properly record/reproduce information on/from every kind of optical information recording media based on different standards, an optical pickup may be provided with multiple kinds of objective lenses engineered for the different optical information recording media, respectively. In this optical pickup including the different kinds of objective lenses, it is necessary to select one from the objective lenses in response to the kind of the target optical information recording medium on or from which information is recorded or reproduced, and therefore a system for selecting the objective lens is required. As a result, the structure of the optical pickup is complicated, resulting in increase in size and cost of the optical pickup.

In connection to such a problem, various methods have been proposed to correct or reduce the aberration (i.e., spherical aberration and the like) which occurs in recording/reproducing information on/from various kinds of optical information recording media based on different standards with use of a single objective lens.

For example, Patent Publication 1 discloses a technique of using a polarized phase correction element including a polymer liquid crystal layer for correcting the spherical aberration (Patent Publication 1: Japanese Unexamined Patent Publication No. 2003-149443).

However, even according to the technique disclosed by Patent Publication 1, it is still difficult for the conventional optical pickup to record/reproduce information on/from various kinds of optical information recording media based on different standards in a suitable manner.

Under these circumstances, the present invention has been achieved. An object of the present invention is to provide an optical pickup capable of suitably recording/reproducing information on/from each of the various kinds of optical information recording media based on different standards.

DISCLOSURE OF THE INVENTION

As a result of intensive studies, the inventors of the present invention have found that an offence against the sine condition is not reduced enough in an optical pickup fabricated according to the technique described in Patent Publication 1 and therefore significant aberration occurs with respect to an off-axis light beam. The present invention has been achieved based on the finding. To be more specific, the inventors of the present invention have focused on the offence against the sine condition to which great attention has not been paid so far, and then found that the reduction of the offence against the sine condition brings about decrease in aberration with respect to the off-axis light beam. Thus, they have provided a device capable of preventing its performance from deteriorating even if the wavelength of light from a light source varies or the thickness of the cover layer varies.

An optical pickup according to the present invention is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer. The optical pickup focuses a laser beam on a certain optical information recording surface corresponding thereto. The optical pickup of the present invention includes: a light source capable of emitting laser beams of different wavelengths corresponding to the optical information recording surfaces, respectively; and an objective optical system for focusing any laser beam emitted from the light source on a certain optical information recording surface corresponding thereto. The objective optical system includes at least two wavefront conversion surfaces and an objective lens. The at least two wavefront conversion surfaces convert a wavefront of a laser beam entered therein into a different wavefront in response to the kind of the optical information recording medium corresponding to the laser beam. The objective lens focuses the laser beam passed through the wavefront converting surfaces on the certain optical information recording surface. The optical pickup of the present invention satisfies the following condition for every wavelength of the corresponding laser beams:

$$|SC_{MAX}| < 0.036$$

wherein $SC_{MAX}$ is the maximum value of an offence against the sine condition of the objective optical system defined by the following formula (2):

$$\{(h/\sin U) - f\}/f \quad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system.

An objective optical system of the present invention is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer. The objective optical system is used for focusing a laser beam on a certain optical information recording surface corresponding thereto. The objective optical system of the present invention includes: at least two wavefront conversion surfaces and an objective lens. The at least two wavefront conversion surfaces convert a wavefront of a laser beam entered therein into a different wavefront in response to the kind of the optical information recording medium corresponding the laser beam. The objective lens focuses the laser beam passed through the wavefront converting surfaces on the certain optical information recording surface. The objective optical system of the present invention satisfies the following condition (1) for every wavelength of the corresponding laser beams:

$$|SC_{MAX}|<0.036$$

wherein $SC_{MAX}$ is the maximum value of an offence against the sine condition of the objective optical system defined by the following formula (1):

$$\{(h/\sin U)-f\}/f \quad (1)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system.

According to the present invention, information is suitably recorded/reproduced on/from various kinds of optical information recording media based on different standards.

BEST MODE FOR CARRYING OUT THE INVENTION

Hereinafter, explanation of an embodiment of the present invention is provided in detail with reference to the drawings.

Figure 1:
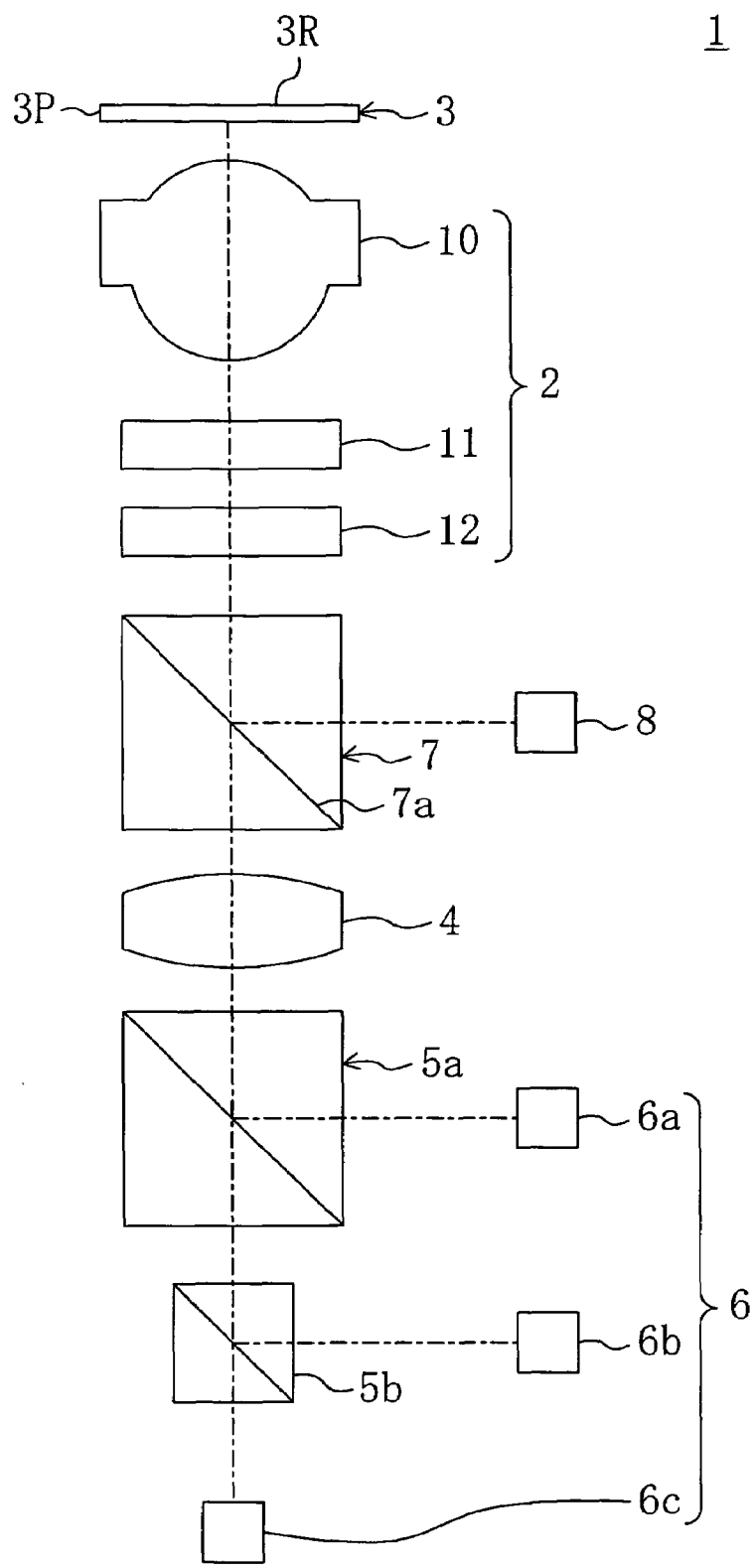
FIG. 1 is a view illustrating the optical structure of an optical pickup 1.

FIG. 1 shows the optical structure of an optical pickup 1 according to the present embodiment.

The optical pickup 1 of the present embodiment is a multi-wavelength optical pickup capable of recording and reproducing information on and from various kinds of information recording media 3 (e.g., optical discs). Each of the optical information recording media 3 includes an information recording surface 3R for recording information and a cover layer 3P covering the information recording surface 3R. Examples of the optical information recording media 3 include optical discs, such as CD (Compact Disc), CD-R (Compact Disc Recordable), CD-RW (Compact Disc Rewritable), CD-ROM (Compact Disc Read Only Memory), DVD (Digital Versatile Disc), DVD-R (Digital Versatile Disc Recordable), DVD-RW (Digital Versatile Disc Rewritable), DVD-ROM (Digital Versatile Disc Read Only Memory), DVD-RAM (Digital Versatile Disc Random Access Memory), EVD (Enhanced Versatile Disc), EVD-R (Enhanced. Versatile Disc Recordable), EVD-RW (Enhanced Versatile Disc Rewritable), EVD-ROM (Enhanced Versatile Disc Read Only Memory), EVD-RAM (Enhanced Versatile Disc Random Access Memory), BD (Blu-ray Disc), BD-R (Blu-ray Disc Recordable), BD-RW (Blu-ray Disc Rewritable), BD-ROM (Blu-ray Disc Read Only Memory), BD-RAM (Blu-ray Disc Random Access Memory), HD-DVD (High Definition Digital Versatile Disc), HD-DVD-R (High Definition Digital Versatile Disc Recordable), HD-DVD-RW (High Definition Digital Versatile Disc Rewritable), HD-DVD-ROM (High Definition Digital Versatile Disc Read Only Memory) and HD-DVD-RAM (High Definition Digital Versatile Disc Random Access Memory).

Each of the optical information recording media 3 is provided with a cover layer 3P having a thickness (a distance from its surface to the information recording surface 3R) corresponding to its kind. For example, a CD has a 1.2 mm thick cover layer 3P. A DVD, an EVD, and an HD-DVD have a 0.6 mm thick cover layer 3P, respectively. A BD has a cover layer 3P of about 0.1 mm thick. Further, laser beams of certain wavelengths are used for the optical information recording media 3, respectively, in response to the kind of the optical information recording media 3. For example, a laser beam of 750 to 820 nm wavelength is used for the CD, a laser beam of 640 to 670 nm wavelength is used for the DVD and EVD and a laser beam of 400 to 415 nm wavelength is used for the BD and HD-DVD.

In the present embodiment, explanation of an example of the optical pickup 1 applicable to three kinds of optical information media 3, i.e., CD, DVD (EVD) and BD, is provided.

The optical pickup 1 of the present embodiment includes a light source 6 capable of emitting laser beams of multiple wavelengths, beam splitters 5a and 5b, a collimator 4, a beam splitter 7, a detector 8 and an objective optical system 2.

The light source 6 is able to selectively emit one of the laser beams of different wavelengths. In detail, the light source 6 selects and emits a laser beam corresponding to the optical information recording surface 3R (e.g., a 750 to 820 nm laser beam for CD, a 640 to 670 nm laser beam for DVD and a 400 to 415 nm laser beam for BD).

More specifically, the light source 6 may include a plurality of light sources (laser beam sources) emitting laser beams of different wavelengths, respectively. As shown in FIG. 1, the light source 6 may include a light source 6a emitting a laser beam of 640 to 670 nm wavelength, a light source 6b emitting a laser beam of 400 to 415 nm wavelength and a light source 6c emitting a laser beam of 750 to 820 nm wavelength.

The optical path of the laser beam from the light source 6a is bent by the beam splitter 5a and guided to the objective optical system 2. The optical path of the laser beam from the light source 6b is bent by the beam splitter 5b, passes through the beam splitter 5a and guided to the objective optical system 2. The laser beam from the light source 6c passes through the beam splitters 5a and 5b toward the objective optical system 2.

The collimator 4 functions to transform the incident light into parallel light beam. The collimator 4 may consist of a single lens. Alternatively, the collimator 4 may consist of an optical system including two lenses, such as a concave lens and a convex lens.

In the present embodiment, the collimator 4 is arranged closer to the optical information recording medium 3 than the beam splitters 5a and 5b. However, a collimator 4 designed exclusively for the light source 6a may be arranged between the beam splitter 5a and the light source 6a and collimators 4 designed exclusively for the light sources 6b and 6c may be arranged between the beam splitter 5b and the light source 6b and between the splitter 5c and the light source 6c, respectively.

The laser beam transformed into parallel light beam by the collimator 4 passes through the beam splitter 7 to enter the objective optical system 2.

The beam splitters 5a and 5b may be replaced with dichroic mirrors. Plane mirrors may be used concurrently. To be more specific, one or more beam splitters, one or more dichroic mirrors and one or more plane mirrors may optionally be combined to provide an optical path combining means. For example, if the light sources 6a, 6b and 6c are arranged on the same optical path or may be movable in response to the position of the optical system, the optical path combining means is not necessarily provided.

The objective optical system 2 includes an objective lens 10, a first wavefront conversion element 11 and a second wavefront conversion element 12. Each of the first and second wavefront conversion elements 11 and 12 is provided with at least one wavefront conversion surface. Specifically, the objective optical system 2 is provided with at least two wavefront conversion surfaces. As long as the at least two wavefront conversion surfaces are provided, the number of the wavefront conversion elements is not questioned. For example, the first and second wavefront conversion elements 11 and 12 may be integrated in one piece. Alternatively, another wavefront conversion element may be provided in addition to the first and second wavefront conversion elements 11 and 12.

Each of the wavefront conversion surfaces may be a photorefractive surface (spherical or aspherical surface), an optical diffraction surface or a surface having a phase grating structure. The at least two wavefront conversion surfaces may be different or the same in shape.

The objective lens 10 is arranged to face the optical information recording medium 3 disposed in the optical pickup 1. The objective lens 10 focuses the laser beam emitted from the light source 6 on the optical information recording surface 3R of the optical information recording medium 3 disposed in the optical pickup 1.

The objective lens 10 may be a biconvex lens or a meniscus lens as shown in FIG. 1. Both surfaces of the objective lens 10 are preferably aspheric.

The laser beam focused on the information recording surface 3R by the function of the objective lens 10 is reflected or scattered on the information recording surface 3R. The laser beam reflected from the information recording surface 3R re-enters the objective optical system 2 and reflected on a reflection surface 7a of the beam splitter 7 to enter a detector 8. The detector 8 measures the intensity of the reflected light and detects information recorded on the information recording surface 3R in accordance with the measured intensity.

In the present embodiment, the first and second wavefront conversion elements 11 and 12 (hereinafter may be referred to as two wavefront conversion elements 11 and 12) are arranged closer to the light source 6 than the objective lens 10.

Each of the at least two wavefront conversion surfaces of the two wavefront conversion elements 11 and 12 changes the wavefront of the laser beam emitted from the light source 6 in response to the kind of the disposed optical information recording medium 3 such that the laser beam is focused on the information recording medium 3 after passing through the objective lens 10.

Specifically, when a DVD is used as the optical information recording medium 3, the at least two wavefront conversion surfaces of the two wavefront conversion elements 11 and 12 adjust the wavefront shape of a 640 to 670 nm laser beam emitted from the light source 6a (convert the wavefront shape or allow the laser beam to pass through without wavefront conversion) such that the laser beam is focused on the information recording surface 3R of the DVD by the function of the objective lens 10.

If a BD is used as the optical information recording medium 3, the wavefront shape of a 400 to 415 nm laser beam emitted from the light source 6b is adjusted (convert the wavefront shape or allow the laser beam to pass through without wavefront conversion) such that the laser beam is focused on the information recording surface 3R of the BD by the function of the objective lens 10.

If a CD is used as the optical information recording medium 3, the wavefront shape of a 750 to 820 nm laser beam emitted from the light source 6c is adjusted (convert the wavefront shape or allow the laser beam to pass through without wavefront conversion) such that the laser beam is focused on the information recording surface 3R of the CD by the function of the objective lens 10.

In other words, the at least two wavefront conversion surfaces of the two wavefront conversion elements 11 and 12 show a wavefront conversion characteristic which varies in response to the kinds of the optical information recording media 3 such that a laser beam corresponding to any one of the optical information recording media 3 is focused on the information recording surface 3R of the optical information recording medium 3.

For example, each of the at least two wavefront conversion surfaces of the two wavefront conversion elements 11 and 12 allows the laser beam emitted from the light source 6b to pass through without wavefront conversion and the laser beams from the light sources 6a and 6c to pass through after the conversion of their wavefront shapes. Alternatively, the laser beams emitted from the light sources 6a, 6b and 6c may be transmitted after the conversion of their wavefront shapes.

As described in the present embodiment, only with the presence of the at least two wavefront conversion surfaces, a corresponding laser beam is focused on each of the information recording surfaces 3R of the different kinds of optical information recording media 3, while the spherical aberration and the offence against the sine condition SC (h) are reduced. Thus, with the optical pickup 1 of the present embodiment, information is recorded/reproduced suitably on/from various kinds of optical information recording media based on different standards.

For example, if only a single wavefront conversion surface is provided, the offence against the sine condition SC (h) cannot be reduced to a sufficient degree for the laser beams of different wavelengths.

The offence against the sine condition SC (h) is defined by the following formula (2) and has correlation to coma aberration. Specifically, the smaller the offence against the sine condition SC (h) is, the more the coma aberration is reduced.

$$\{(h/\sin U)-f\}/f \qquad (2)$$

wherein h is a distance from an optical axis of the objective lens 10 to the laser beam entering the objective lens 10, U is an angle formed between the optical axis and the travel direction of the laser beam entered the objective lens 10 from at the distance h from the optical path and passed through the objective lens 10 and f is a focal distance of the objective optical system 2.

Preferably, the maximum value $SC_{MAX}$ of the offence against the sine condition SC (h) relative to an effective diameter of the objective lens 10 satisfies the following condition (1). More preferably, the $SC_{MAX}$ satisfies the following condition (1-a).

$$|SC_{MAX}|<0.036 \quad (1)$$

$$|SC_{MAX}|<0.01 \quad (1\text{-}a)$$

The formula (1) described above defines the range of the offence against the sine condition SC (h) desirable for providing an excellent spot on the information recording surface 3R by the function of the objective lens 10 even if the normal of the information recording surface 3R is inclined with respect to the optical axis of the objective optical system 2. If the formula (1) is satisfied, an excellent spot is formed on the information recording surface 3R even if the normal of the information recording surface 3R is inclined with respect to the optical axis of the objective optical system 2, irrespective of the different kinds of the optical information recording media 3.

If the SC (h) goes out of the range of the formula (1), it tends to be difficult to form the excellent spot on the information recording surface 3R when the normal of the information recording surface 3R is inclined with respect to the optical axis of the objective optical system 2.

The wavefront conversion surface 12 preferably meets the following conditional expression (3):

$$0.8<\phi_O/\phi_T<1.2 \quad (3)$$

wherein $\phi_O$ is a power of the objective lens and
$\phi_T$ is a power of the objective optical system.

The conditional expression (3) defines the power range of the objective lens. If the power goes out of the upper or lower limit of the conditional expression (3), the combined power of the two wavefront conversion surfaces becomes too high as compared with the power of the objective lens to correct the aberration caused by the wavefront conversion surfaces by the objective lens.

The wavefront conversion surface 12 preferably satisfies the following conditional expression (4) for every wavelength of the corresponding laser beams:

$$0\leq\phi_C/\phi_T<1.2 \quad (4)$$

wherein $\phi_C$ is a combined power of the wavefront conversion surfaces and
$\phi_T$ is a power of the objective optical system.

The conditional expression (4) defines the combined power range of the wavefront conversion surfaces. If the combined power goes out of the upper or lower limit of the conditional expression (4), the combined power of the two wavefront conversion surfaces becomes too high as compared with the power of the objective lens to correct the aberration caused by the wavefront conversion surfaces by the objective lens.

The wavefront conversion surface 12 preferably satisfies the following conditional expression (5) for every wavelength of the corresponding laser beams:

$$0\leq\Delta|\phi_C/\phi_T|/\Delta\lambda<1.2 \quad (5)$$

wherein $\phi_C$ is a combined power of the wavefront conversion surfaces,
$\phi_T$ is a power of the objective optical system,
$\Delta|\phi_C/\phi_T|$ is a rate of change of the combined power of the wavefront conversion surfaces and
$\Delta\lambda$ is a variation in wavelength (µm).

The conditional expression (5) defines the wavelength characteristic of the wavefront conversion surfaces. If the combined power goes out of the upper limit of the conditional expression (5), the combined power of the wavefront conversion surfaces become too susceptible to the variation in wavelength. As a result, variation of principal plane of the lens increases, thereby making it difficult to perform recording/reproducing with stability.

The powers of the two wavefront conversion surfaces preferably have different signs for every corresponding laser beam, i.e., the surfaces satisfy the following conditional expression (6):

$$\phi_1\cdot\phi_2\leq 0 \quad (6)$$

If the two wavefront conversion surfaces have the power of the same sign for the corresponding laser beam, the sine condition cannot be properly controlled easily.

Specific Configuration 1

Figure 2:
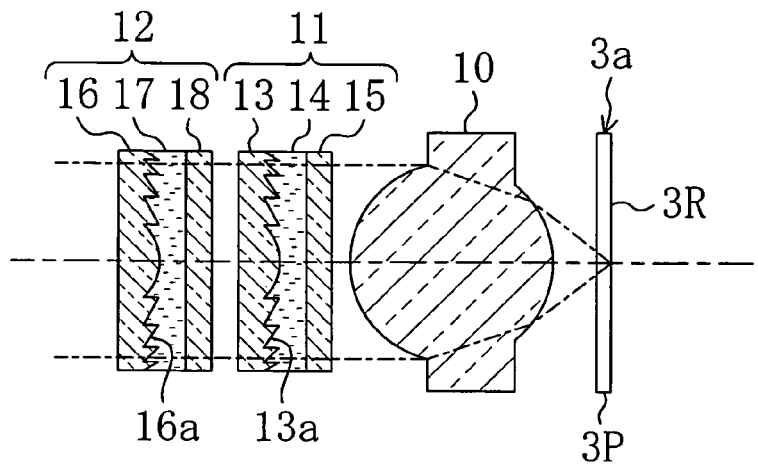
FIG. 2 is a schematic ray diagram of an objective optical system 2 of Specific Configuration 1 (Example 1) used in the optical pickup 1 where a laser beam of 405 nm wavelength is used.
Figure 3:
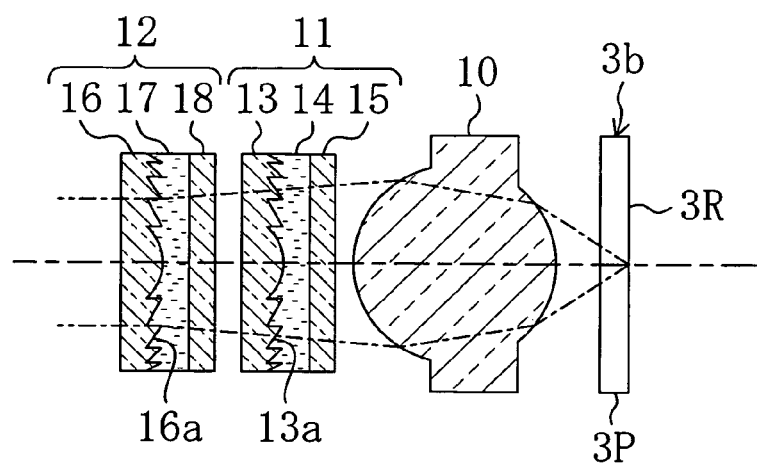
FIG. 3 is a schematic ray diagram of the objective optical system 2 of Specific Configuration 1 (Example 1) used in the optical pickup 1 where a laser beam of 780 nm wavelength is used.

Referring to FIGS. 2 and 3, explanation of the two wavefront conversion surfaces 11 and 12 of Specific Configuration 1 is provided.

FIG. 2 is a schematic ray diagram of an objective optical system 2 of Specific Configuration 1 used in an optical pickup 1 where a laser beam of 405 nm wavelength is used.

FIG. 3 is a schematic ray diagram of the objective optical system 2 of Specific Configuration 1 used in the optical pickup 1 where a laser beam of 780 nm wavelength is used.

Hereinafter, a BD, a DVD and a CD are indicated by reference numerals 3a, 3c and 3b, respectively, in the specification and the drawings.

As shown in FIGS. 2 and 3, the first and second wavefront conversion elements 11 and 12 may be liquid crystal elements, respectively.

To be more specific, the first wavefront conversion element 11 includes a substrate 13, a liquid crystal layer 14 and a substrate 15. The substrates 13 and 15 are arranged to face each other with the liquid crystal layer interposed therebetween. Optically transparent electrodes (not shown) are formed on the surfaces of the substrates 13 and 15 facing the liquid crystal layer 14, respectively. The refractive index of the liquid crystal layer 14 is adjusted by changing a voltage applied to the pair of electrodes. The surface of the substrate 13 facing the liquid crystal layer 14 serves as a wavefront conversion surface 13a.

The second wavefront conversion element 12 includes a substrate 16, a liquid crystal layer 17 and a substrate 18. The substrates 16 and 18 are arranged to face each other with the liquid crystal layer interposed therebetween. Optically transparent electrodes (not shown) are formed on the surfaces of the substrates 16 and 18 facing the liquid crystal layer 14, respectively. The refractive index of the liquid crystal layer 17 is adjusted by changing a voltage applied to the pair of electrodes. The surface of the substrate 16 facing the liquid crystal layer 14 serves as a wavefront conversion surface 16a. Thus, Specific Configuration 1 includes two wavefront conversion surfaces 13a and 16a. Each of the two wavefront conversion surfaces 13a and 16a is in contact with the liquid crystal layer. Therefore, even if the wavelength of the incident laser beam is unchanged, the wavefront conversion function can be varied by changing the refractive index of the liquid crystal layer. Thus, Specific Configuration 2 makes it possible to provide the objective optical system 2 and the optical pickup 1 capable of recording/reproducing information on/from different kinds of optical information recording media 3 which are the same in thickness of the cover layer 3P but different in wavelength of the laser beam used (e.g., BD and HD-DVD).

To be more specific, as shown in FIG. 2, when a 405 nm wavelength laser beam is emitted from a light source 6b, the refractive indices of the liquid crystal layers 14 and 17 are adjusted such that the laser beam is focused on the information recording surface 3R of the BD 3a. As shown in FIG. 3, when a 780 nm wavelength laser beam is emitted from a light source 6c, the refractive indices of the liquid crystal layers 14 and 17 are adjusted such that the laser beam is focused on the information recording surface 3R of the CD 3b. Further, if a 650 nm wavelength laser beam is emitted from a light source 6a, the refractive indices of the liquid crystal layers 14 and 17 are adjusted such that the laser beam is focused on the information recording surface 3R of the DVD. Thus, the refractive indices of the liquid crystal layers 14 and 17 are varied in response to the wavelength of the laser beam emitted from the light source 6 capable of emitting laser beams of various wavelengths.

Next, detailed explanation of how to make an aberration correction for various wavelengths in Specific Configuration 1 is provided.

As shown in FIG. 2, when the BD 3a is used, the light source 6b is selected to emit a 405 nm wavelength laser beam as a divergent ray. The laser beam from the light source 6b passes through the beam splitters 5a and 5b and transformed into a parallel light beam by the collimator 4. The parallel light beam passes through the beam splitter 7 and enters the second wavefront conversion element 12. At this time, the refractive index of the liquid crystal layer 17 is adjusted to be equal to that of the substrate 16. Therefore, the wavefront conversion surface 16a does not perform the wavefront conversion. Accordingly, the second wavefront conversion element 12 allows the parallel light beam of 405 nm wavelength to pass through without wavefront conversion.

The laser beam passed through the second wavefront conversion element 12 enters the first wavefront conversion element 11. At this time, the refractive index of the liquid crystal layer 14 is adjusted to be equal to that of the substrate 13. Therefore, the wavefront conversion surface 13a does not perform the wavefront conversion. Accordingly, the second wavefront conversion element 12 allows the parallel light beam of 405 nm wavelength to pass through without wavefront conversion.

As a result, the parallel light beam of 405 nm wavelength enters the objective lens 10. In Specific Configuration 1, the aberration of the objective lens 10 has been corrected such that the parallel light beam of 405 nm wavelength is suitably focused on the information recording surface 3R of the BD 3a. Thus, an excellent spot is obtained on the information recording surface 3R of the BD 3a with reduced spherical aberration and coma aberration.

Referring to FIG. 3, when the CD 3b is used, the light source 6c is selected to emit a 780 nm wavelength laser beam as a divergent ray. The laser beam from the light source 6c passes through the beam splitters 5a and 5b and transformed into a parallel light beam by the collimator 4. The parallel light beam passes through the beam splitter 7 and enters the second wavefront conversion element 12. At this time, the refractive index of the liquid crystal layer 17 is adjusted to be different from that of the substrate 16. Therefore, the wavefront conversion surface 16a converts the wavefront shape of the laser beam entered the second wavefront conversion element 12. To be more specific, in Specific Configuration 1, the parallel light beam of 780 nm wavelength entered the second wavefront conversion element 12 is transformed into a divergent ray.

The laser beam passed through the second wavefront conversion element 12 enters the first wavefront conversion element 11. At this time, the refractive index of the liquid crystal layer 14 is adjusted to be different from that of the substrate 13. Therefore, the wavefront conversion surface 13a converts the wavefront shape of the laser beam entered the second wavefront conversion element 12.

As a result, the divergent ray of 780 nm wavelength enters the objective lens 10. The wavefront shape of the 780 nm wavelength divergent ray makes it possible to form an excellent spot on the information recording surface 3R of the CD 3b with reduced spherical aberration and coma aberration by the function of the objective lens 10. Thus, an excellent spot is obtained on the information recording surface 3R of the CD 3b with reduced spherical aberration and coma aberration.

When a DVD is used, the refractive indices of the liquid crystal layers 14 and 17 are also adjusted such that a 650 nm wavelength laser beam emitted from the light source 6a forms an excellent spot on the information recording surface 3R of the DVD with reduced spherical aberration and coma aberration in the same manner as when the CD 3b is used.

As described above, the two wavefront conversion elements 11 and 12 allow the transmission of the 405 nm wavelength laser beam without the conversion of the wavefront shape, while they allow the transmission of the laser beams of other wavelengths after the conversion of their wavefront shapes in response to their wavelengths. The objective lens 10 is engineered such that the parallel light beam of 405 nm wavelength forms an excellent spot on the information recording surface 3R of the BD 3a with reduced spherical aberration and coma aberration. A combination of the two wavefront conversion elements 11 and 12 and the objective lens 10 makes it possible to form an excellent spot on each of the information recording surfaces 3R of various kinds of optical information recording media 3 with reduced spherical aberration and coma aberration. Further, since only a single objective lens 10 is used in the optical system, the optical pickup 1 is reduced in size.

The wavefront conversion surfaces 13a and 16a preferably have an axial distance of 0.2 mm or more. More preferably, the axial distance is 0.4 mm or more (e.g., 0.5 mm). If the axial distance between the wavefront conversion surfaces 13a and 16a is less than 0.2 mm, the offence against the sine condition is likely to increase and the wavefront conversion surfaces 13a and 16a become more difficult to fabricate. Further, aberration that occurs when the optical axes of the wavefront conversion surfaces 13a and 16a are misaligned is likely to increase, thereby reducing assembly tolerance of the optical pickup 1.

Specific Configuration 2

Figure 4:
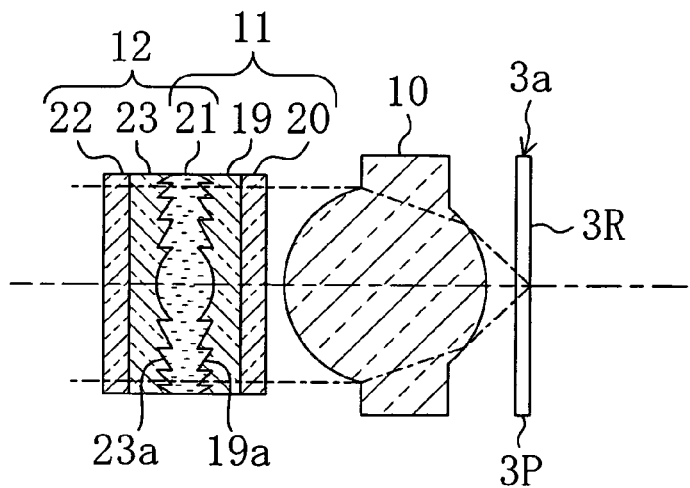
FIG. 4 is a schematic ray diagram of an objective optical system 2 of Specific Configuration 2 (Examples 2 and 3) used in an optical pickup 1 where a laser beam of 405 nm wavelength is used.
Figure 5:
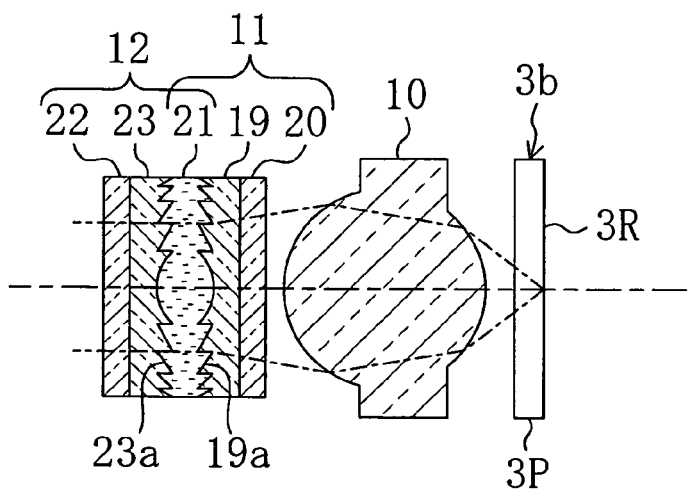
FIG. 5 is a schematic ray diagram of the objective optical system 2 of Specific Configuration 2 (Examples 2 and 3) used in the optical pickup 1 where a laser beam of 780 nm wavelength is used.

Referring to FIGS. 4 and 5, explanation of the two wavefront conversion elements 11 and 12 of Specific Configuration 2 is provided.

FIG. 4 is a schematic ray diagram of an objective optical system 2 of Specific Configuration 2 used in an optical pickup 1 where a laser beam of 405 nm wavelength is used.

FIG. 5 is a schematic ray diagram of the objective optical system 2 of Specific Configuration 2 used in the optical pickup 1 where a laser beam of 780 nm wavelength is used.

Specific Configuration 2 is the same as Specific Configuration 1 in that the two wavefront conversion elements 11 and 12 are made of liquid crystal elements. However, Specific Configuration 2 is different from Specific Configuration 1 in that the first and second wavefront conversion elements 11 and 12 are integrated in one piece with a liquid crystal layer 21 shared between them.

To be more specific, the first wavefront conversion element 11 includes a substrate 19, a substrate 20 and a liquid crystal layer 21 sandwiched between a pair of electrodes (the liquid crystal layer 21 also serves as a component of the second wavefront conversion element 12). The surface of the substrate 19 facing the liquid crystal layer 21 serves as a wavefront conversion surface 19a.

The second wavefront conversion element 12 includes a substrate 22, a substrate 23 and the liquid crystal layer 21 sandwiched between the pair of electrodes. The refractive index of the liquid crystal layer 21 is adjusted by changing a voltage applied to the pair of electrodes. The surface of the substrate 23 facing the liquid crystal layer 21 serves as a wavefront conversion surface 23a. Thus, like Specific Configuration 1, Specific Configuration 2 also includes two wavefront conversion surfaces 19a and 23a.

In Specific Configuration 2, the refractive index of the substrates 23 and 19 are set equal.

As shown in FIG. 4, when a 405 nm wavelength laser beam is emitted from a light source 6b, the refractive index of the liquid crystal layer 21 is adjusted such that the laser beam is focused on the information recording surface 3R of the BD 3a. As shown in FIG. 5, when a 780 nm wavelength laser beam is emitted from a light source 6c, the refractive index of the liquid crystal layer 21 is adjusted such that the laser beam is focused on the information recording surface 3R of the CD 3b. Further, if a 650 nm wavelength laser beam is emitted from the light source 6a, the refractive index of the liquid crystal layer 21 is adjusted such that the laser beam is focused on the information recording surface 3R of the DVD. Thus, the refractive index of the liquid crystal layer 21 is varied in response to the wavelength of the laser beam emitted from the light source 6 capable of emitting laser beams of various wavelengths. Due to the change in refractive index of the liquid crystal layer 21, the wavefront conversion characteristics of the two wavefront conversion elements 11 and 12 (the wavefront conversion characteristics of the wavefront conversion surfaces 19a and 23a) are varied, respectively. Thus, spherical aberration and coma aberration, which is caused by the refractive index of the objective lens 10 which varies in response to the wavelength of the laser beam emitted from the light source 6 and the difference in thickness between the cover layers 3P of the optical information recording media 3, are properly corrected.

Next, detailed explanation of how to make an aberration correction for various wavelengths in Specific Configuration 2 is provided.

As shown FIG. 4, when the BD 3a is used, the light source 6b is selected to emit a 405 nm wavelength laser beam as a divergent ray. The laser beam from the light source 6b passes through the beam splitters 5a and 5b and transformed into a parallel light beam by the collimator 4. The parallel light beam passes through the beam splitter 7 and enters the wavefront conversion elements 11 and 12. At this time, the refractive index of the liquid crystal layer 21 is adjusted to be equal to the refractive indices of the substrates 19 and 23. Therefore, the wavefront conversion surfaces 19a and 23a do not perform the wavefront conversion. Accordingly, the wavefront conversion elements 11 and 12 (the wavefront conversion surfaces 19a and 23a) allow the parallel light beam of 405 nm wavelength to pass through without wavefront conversion.

As a result, the parallel light beam of 405 nm wavelength enters the objective lens 10. In Specific Configuration 2, the aberration of the objective lens 10 has been corrected such that the light beam of 405 nm wavelength is suitably focused on the information recording surface 3R of the BD 3a. Thus, an excellent spot is obtained on the information recording surface 3R of the BD 3a with reduced spherical aberration and coma aberration.

Referring to FIG. 5, when the CD 3b is used, the light source 6c is selected to emit a 780 nm wavelength laser beam as a divergent ray. The laser beam from the light source 6c passes through the beam splitters 5a and 5b and transformed into a parallel light beam by the collimator 4. The parallel light beam passes through the beam splitter 7 and enters the wavefront conversion elements 11 and 12. At this time, the refractive index of the liquid crystal layer 21 is adjusted to be different from the refractive indices of the substrates 19 and 23. Therefore, the wavefront conversion surfaces 19a and 23a convert the wavefront shape of the laser beam entered the wavefront conversion elements 11 and 12. To be more specific, in Specific Configuration 2, the parallel light beam of 780 nm wavelength entered the wavefront conversion elements 11 and 12 (the wavefront conversion surfaces 19a and 23a) is transformed into a divergent ray.

As a result, the divergent ray of 780 nm wavelength enters the objective lens 10. The wavefront shape of the 780 nm wavelength divergent ray makes it possible to form an excellent spot on the information recording surface 3R of the CD 3b with reduced spherical aberration and coma aberration by the function of the objective lens 10. Thus, an excellent spot is obtained on the information recording surface 3R of the CD 3b with reduced spherical aberration and coma aberration.

When a DVD is used, the refractive index of the liquid crystal layer 21 is also adjusted such that a 650 nm wavelength laser beam emitted from the light source 6a forms an excellent spot on the information recording surface 3R of the DVD with reduced spherical aberration and coma aberration in the same manner as when the CD 3b is used.

The wavefront conversion surfaces 19a and 23a preferably have an axial distance of 0.2 mm or more. More preferably, the axial distance is 0.4 mm or more (e.g., 0.5 mm). If the axial distance between the wavefront conversion surfaces 19a and 23a is less than 0.2 mm, the offence against the sine condition is likely to increase and the wavefront conversion surfaces 19a and 23a becomes less easy to fabricate. Further, aberration that occurs when the optical axes of the wavefront conversion surfaces 19a and 23a are misaligned is likely to increase, thereby reducing assembly tolerance of the optical pickup 1.

In Specific Configuration 2, each of the wavefront conversion elements 11 and 12 has a single wavefront conversion surface. However, the wavefront conversion elements 11 and 12 may have two or more wavefront conversion surfaces, respectively.

Specific Configuration 3

Figure 6:
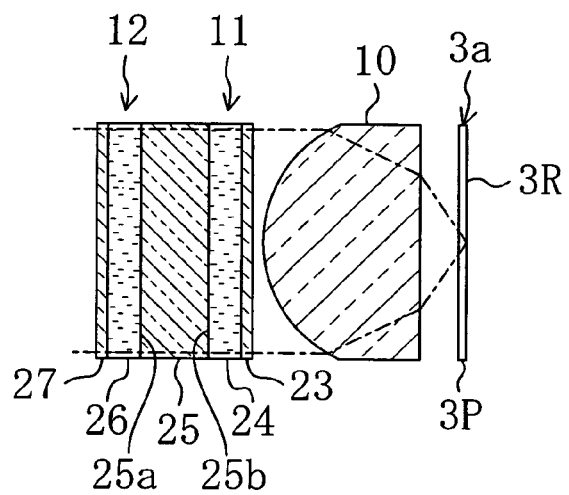
FIG. 6 is a schematic ray diagram of an objective optical system 2 of Specific Configuration 3 (Example 4) used in an optical pickup 1 where a laser beam of 408 nm wavelength is used.
Figure 7:
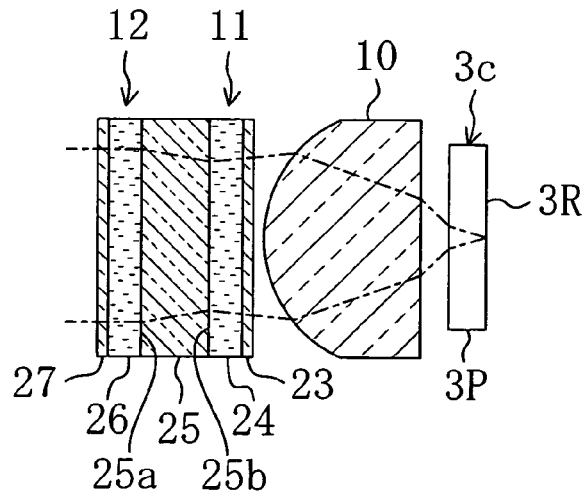
FIG. 7 is a schematic ray diagram of the objective optical system 2 of Specific Configuration 3 (Example 4) used in the optical pickup 1 where a laser beam of 660 nm wavelength is used.
Figure 8:
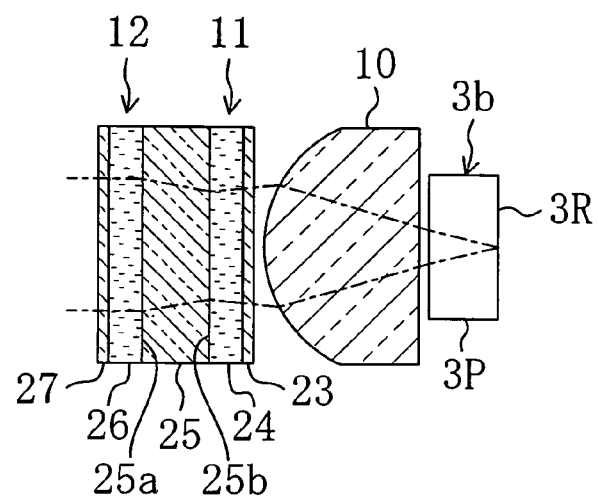
FIG. 8 is a schematic ray diagram of the objective optical system 2 of Specific Configuration 3 (Example 4) used in the optical pickup 1 where a laser beam of 780 nm wavelength is used.

Referring to FIGS. 6 to 8, explanation of the two wavefront conversion elements 11 and 12 of Specific Configuration 3 is provided.

FIG. 6 is a schematic ray diagram of an objective optical system 2 of Specific Configuration 3 used in an optical pickup 1 where a laser beam of 405 nm wavelength is used.

FIG. 7 is a schematic ray diagram of the objective optical system 2 of Specific Configuration 3 used in the optical pickup 1 where a laser beam of 650 nm wavelength is used.

FIG. 8 is a schematic ray diagram of the objective optical system 2 of Specific Configuration 3 used in the optical pickup 1 where a laser beam of 780 nm wavelength is used.

In Specific Configuration 3, the two wavefront conversion elements 11 and 12 include liquid crystal diffractive lenses, respectively, and bonded to each other in one piece.

To be more specific, the first wavefront conversion element 11 includes a substrate 23, a substrate 25 facing the substrate 23 (also serves as a component of the second wavefront conversion element 12) and a liquid crystal layer 24 sandwiched between the substrates 23 and 25. Electrodes (not shown) are formed on the surfaces of the substrates 23 and 25 facing the liquid crystal layer 24, respectively, for applying a voltage to the liquid crystal layer 24. The liquid crystal layer 24 sandwiched between the pair of electrodes serves as a liquid crystal diffractive lens. The surface of the substrate 25 facing the liquid crystal layer 24 serves as a wavefront conversion surface 25b.

The second wavefront conversion element 12 includes the substrate 25 (also serves as a component of the first wavefront conversion element 11), a substrate 27 facing the substrate 25 and a liquid crystal layer 26 provided between the substrates 25 and 27. Electrodes (not shown) are formed on the surfaces of the substrates 25 and 27 facing the liquid crystal layer 26, respectively, to apply a voltage to the liquid crystal layer 26. The liquid crystal layer 26 sandwiched between the pair of electrodes serves as a liquid crystal diffractive lens. The surface of the substrate 25 facing the liquid crystal layer 26 serves as a wavefront conversion surface 25a.

Thus, like Specific Configuration 2, Specific Configuration 3 also includes a substantially single wavefront conversion element provided with two wavefront conversion surfaces 25a and 25b.

As shown in FIG. 6, when a 408 nm wavelength laser beam is emitted from a light source 6b, the refractive indices of the liquid crystal layers 24 and 26 are adjusted such that the laser beam is focused on the information recording surface 3R of the BD 3a. As shown in FIG. 7, when a 660 nm wavelength laser beam is emitted from a light source 6a, the refractive indices of the liquid crystal layers 24 and 26 are adjusted such that the laser beam is focused on the information recording surface 3R of the DVD 3c. Further, as shown in FIG. 8, when a 780 nm wavelength laser beam is emitted from a light source 6c, the refractive indices of the liquid crystal layers 24 and 26 are adjusted such that the laser beam is focused on the information recording surface 3R of the CD 3b. Thus, the refractive indices of the liquid crystal layers 24 and 26 are varied in response to the wavelength of the laser beam emitted from the light source 6 capable of emitting laser beams of various wavelengths.

Due to the change of the refractive indices of the liquid crystal layers 24 and 26, the wavefront conversion characteristics of the wavefront conversion surfaces 19a and 23a are varied, respectively. Thus, spherical aberration and coma aberration, which is caused by the refractive index of the objective lens 10 which varies in response to the wavelength of the laser beam emitted from the light source 6 and the difference in thickness between the cover layers 3P of the optical information recording media 3, are properly corrected.

Next, detailed explanation of how to make an aberration correction for various wavelengths in Specific Configuration 3 is provided.

As shown FIG. 6, when the BD 3a is used, the light source 6b is selected to emit a 408 nm wavelength laser beam as a divergent ray. The laser beam from the light source 6b passes through the beam splitters 5a and 5b and transformed into a parallel light beam by the collimator 4. The parallel light beam passes through the beam splitter 7 and enters the wavefront conversion elements 11 and 12. At this time, the refractive indices of the liquid crystal layers 24 and 26 are adjusted to be equal to the refractive index of the substrate 25. Therefore, the wavefront conversion surfaces 25a and 25b do not perform the wavefront conversion. Accordingly, the wavefront conversion elements 11 and 12 (the wavefront conversion surfaces 25a and 25b) allow the parallel light beam of 408 nm wavelength to pass through without wavefront conversion.

As a result, the parallel light beam of 408 nm wavelength enters the objective lens 10. In Specific Configuration 3, the aberration of the objective lens 10 has been corrected such that the light beam of 408 nm wavelength is suitably focused on the information recording surface 3R of the BD 3a. Thus, an excellent spot is obtained on the information recording surface 3R of the BD 3a with reduced spherical aberration and coma aberration.

Referring to FIG. 7, when the DVD 3c is used, the light source 6a is selected to emit a 660 nm wavelength laser beam as a divergent ray. The laser beam from the light source 6a passes through the beam splitters 5a and 5b and transformed into a parallel light beam by the collimator 4. The parallel light beam passes through the beam splitter 7 and enters the wavefront conversion elements 11 and 12. At this time, the refractive indices of the liquid crystal layers 24 and 26 are adjusted to be different from the refractive index of the substrate 25. Therefore, the wavefront conversion surfaces 25a and 25b convert the wavefront shape of the laser beam entered the wavefront conversion elements 11 and 12. In Specific Configuration 3, the parallel light beam of 660 nm wavelength entered the wavefront conversion elements 11 and 12 is transformed into a convergent ray by the wavefront conversion surface 25a and then into a divergent ray by the wavefront conversion surface 25b.

As a result, the divergent ray of 660 nm wavelength enters the objective lens 10. The wavefront shape of the divergent ray of 660 nm wavelength makes it possible to form an excellent spot on the information recording surface 3R of the DVD 3c with reduced spherical aberration and coma aberration by the function of the objective lens 10. Thus, an excellent spot is obtained on the information recording surface 3R of the DVD 3c with reduced spherical aberration and coma aberration.

Referring to FIG. 8, when the CD 3b is used, the light source 6c is selected to emit a 780 nm wavelength laser beam as a divergent ray. The laser beam from the light source 6c passes through the beam splitters 5a and 5b and transformed into a parallel light beam by the collimator 4. The parallel light beam passes through the beam splitter 7 and enters the wavefront conversion elements 11 and 12. At this time, the refractive indices of the liquid crystal layers 24 and 26 are adjusted to be different from the refractive index of the substrate 25. Therefore, the wavefront conversion surfaces 25a and 25b convert the wavefront shape of the laser beam entered the wavefront conversion elements 11 and 12. To be more specific, in Specific Configuration 3, the parallel light beam of 780 nm wavelength entered the wavefront conversion elements 11 and 12 (the wavefront conversion surfaces 19a and 23a) is transformed into a convergent ray by the wavefront conversion surface 25a and then into the divergent ray by the wavefront conversion surface 25b.

As a result, the divergent ray of 780 nm wavelength enters the objective lens 10. The wavefront shape of the divergent ray of 780 nm wavelength makes it possible to form an excellent spot on the information recording surface 3R of the CD 3b with reduced spherical aberration and coma aberration by the function of the objective lens 10. Thus, an excellent spot is obtained on the information recording surface 3R of the CD 3b with reduced spherical aberration and coma aberration.

Specific Configuration 4

Figure 9:
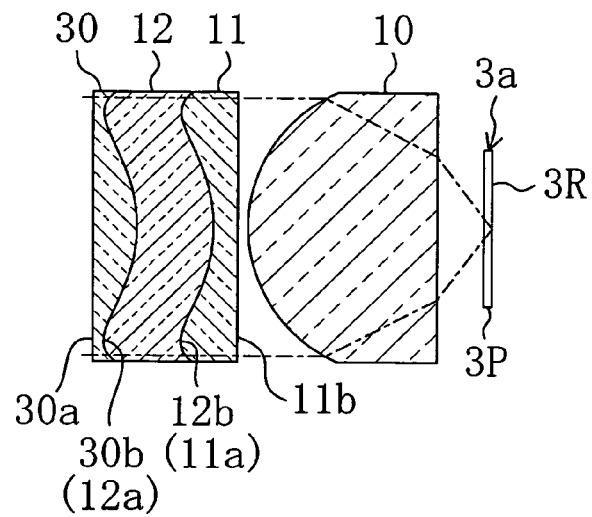
FIG. 9 is a schematic ray diagram of an objective optical system 2 of Specific Configuration 4 (Example 5) used in an optical pickup 1 where a laser beam of 408 nm wavelength is used.
Figure 10:
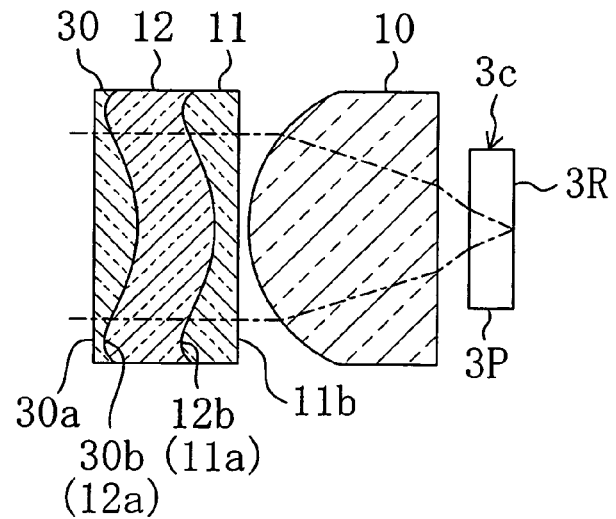
FIG. 10 is a schematic ray diagram of the objective optical system 2 of Specific Configuration 4 (Example 5) used in the optical pickup 1 where a laser beam of 660 nm wavelength is used.
Figure 11:
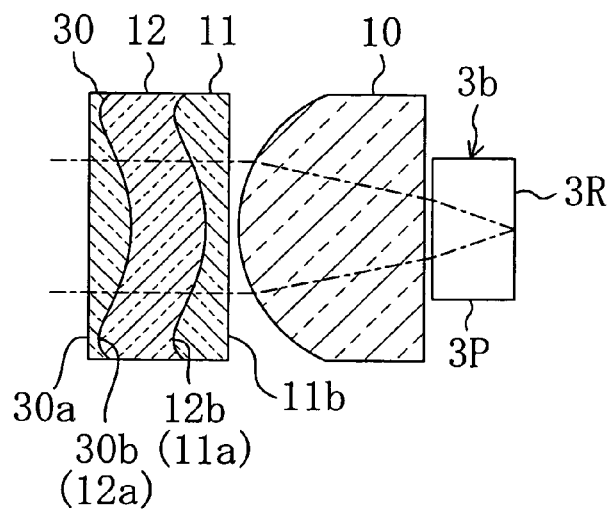
FIG. 11 is a schematic ray diagram of the objective optical system 2 of Specific Configuration 4 (Example 5) used in the optical pickup 1 where a laser beam of 780 nm wavelength is used.

Referring to FIGS. 9 to 11, explanation of the two wavefront conversion elements 11 and 12 of Specific Configuration 4 is provided.

FIG. 9 is a schematic ray diagram of an objective optical system 2 used in an optical pickup 1 of Specific Configuration 4 where a laser beam of 408 nm wavelength is used.

FIG. 10 is a schematic ray diagram of the objective optical system 2 of Specific Configuration 4 used in the optical pickup 1 where a laser beam of 660 nm wavelength is used.

FIG. 11 is a schematic ray diagram of the objective optical system 2 of Specific Configuration 4 used in the optical pickup 1 where a laser beam of 780 nm wavelength is used.

In Specific Configuration 4, another wavefront conversion element 30 is provided in addition to the two wavefront conversion elements 11 and 12. That is, three wavefront conversion elements 11, 12 and 30 are provided and they are combined into one piece.

Each of the three wavefront conversion elements 11, 12 and 30 has wavefront conversion surfaces on both surfaces. To be more specific, the wavefront conversion element 11 has a wavefront conversion surface 11b facing the objective lens 10 and a wavefront conversion surface 11b. The wavefront conversion element 12 has a wavefront conversion surface 12b identical to the wavefront conversion surface 11a and a wavefront conversion surface 12a. The wavefront conversion element 30 has a wavefront conversion surface 30b Identical to the wavefront conversion surface 12a and a wavefront conversion surface 30a. Thus, Specific Configuration 4 includes three wavefront conversion elements with four wavefront conversion surfaces.

The wavefront conversion surfaces 11a (12b), 11b, 30a and 30b (12a) perform wavefront conversion in response to the wavelength of the laser beam emitted from the light source 6 such that a 408 nm wavelength laser beam from the light source 6b is focused on the information recording surface 3R of the BD 3a as shown in FIG. 9, a 660 nm wavelength laser beam from the light source 6a is focused on the information recording surface 3R of the DVD 3c as shown in FIG. 10 and a 780 nm wavelength laser beam from the light source 6c is focused on the information recording surface 3R of the CD 3b as shown in FIG. 11.

Specifically, each of the wavefront conversion surfaces 11a (12b), 11b, 30a and 30b (12a) has wavelength dependence and each of their wavefront conversion characteristics is varied in response to the wavelength of the laser beam emitted from the light source 6. Due to the change of the wavefront conversion characteristics of the wavefront conversion surfaces 11a (12b), 11b, 30a and 30b (12a), spherical aberration and coma aberration, which is caused by the refractive index of the objective lens 10 which varies in response to the wavelengths of the laser beams emitted from the light source 6 and the difference in thickness between the cover layers 3P of different optical information recording media 3, are properly corrected.

Next, detailed explanation of how to make an aberration correction for various wavelengths in Specific Configuration 4 is provided.

As shown in FIG. 9, when the BD 3a is used, the light source 6b is selected to emit a 408 nm wavelength laser beam as a divergent ray. The laser beam from the light source 6b passes through the beam splitters 5a and 5b and transformed into a parallel light beam by the collimator 4. The parallel light beam passes through the beam splitter 7 and enters the wavefront conversion elements 11, 12 and 30.

In Specific Configuration 4, the wavefront conversion surfaces 11a (12b), 11b, 30a and 30b (12a) allow the transmission of the 408 nm wavelength laser beam entered the wavefront conversion elements 11, 12 and 30 without wavefront conversion. Therefore, the parallel light beam of 408 nm wavelength passes through the wavefront conversion elements 11, 12 and 30 without wavefront conversion.

As a result, the parallel light beam of 408 nm wavelength enters the objective lens 10. In Specific Configuration 4, the aberration of the objective lens 10 has been corrected such that the light beam of 408 nm wavelength is suitably focused on the information recording surface 3R of the BD 3a. Thus, an excellent spot is obtained on the information recording surface 3R of the BD 3a with reduced spherical aberration and coma aberration.

Referring to FIG. 10, when the DVD 3c is used, the light source 6a is selected to emit a 660 nm wavelength laser beam as a divergent ray. The laser beam from the light source 6a passes through the beam splitters 5a and 5b and transformed into parallel light beam by the collimator 4. The parallel light beam passes through the beam splitter 7 and enters the wavefront conversion elements 11, 12 and 30. The wavefront conversion surfaces 11a (12b), 11b, 30a and 30b (12a) convert the wavefront shape of the 408 nm wavelength laser beam entered the wavefront conversion elements 11, 12 and 30 such that the laser beam passed through the objective lens 10 is suitably focused on the information recording surface 3R of the DVD 3c.

As a result, an excellent spot is formed on the information recording surface 3R of the DVD 3c with reduced spherical aberration and coma aberration by the function of the objective lens 10.

Referring to FIG. 11, when the CD 3b is used, the light source 6c is selected to emit a 780 nm wavelength laser beam as a divergent ray. The laser beam from the light source 6c passes through the beam splitters 5a and 5b and transformed into parallel light beam by the collimator 4. The parallel light beam passes through the beam splitter 7 and enters the wavefront conversion elements 11, 12 and 30. The wavefront conversion surfaces 11a (12b), 11b, 30a and 30b (12a) convert the wavefront shape of the 780 nm wavelength laser beam entered the wavefront conversion elements 11, 12 and 30 such that the laser beam passed through the objective lens 10 is suitably focused on the information recording surface 3R of the CD 3b.

As a result, an excellent spot is formed on the information recording surface 3R of the CD 3b with reduced spherical aberration and coma aberration by the function of the objective lens 10.

Specific Configuration 5

Figure 12:
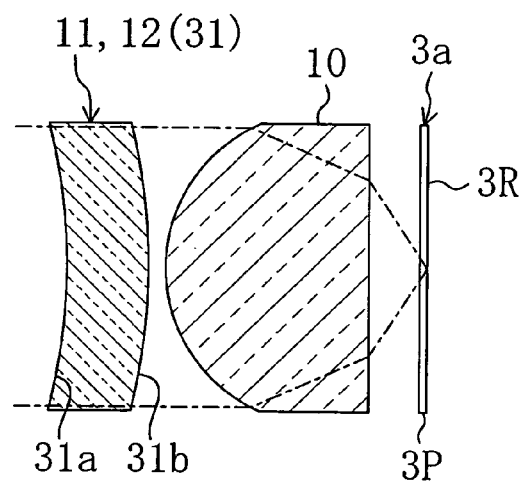
FIG. 12 is a schematic ray diagram of an objective optical system 2 of Specific Configuration 5 (Example 6) used in an optical pickup 1 where a laser beam of 408 nm wavelength is used.
Figure 13:
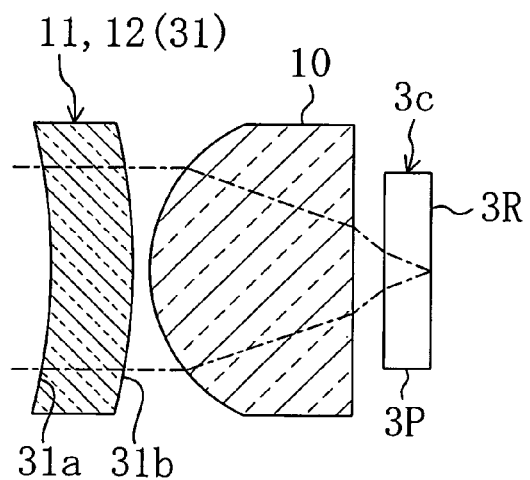
FIG. 13 is a schematic ray diagram of the objective optical system 2 of Specific Configuration 5 (Example 6) used in the optical pickup 1 where a laser beam of 660 nm wavelength is used.
Figure 14:
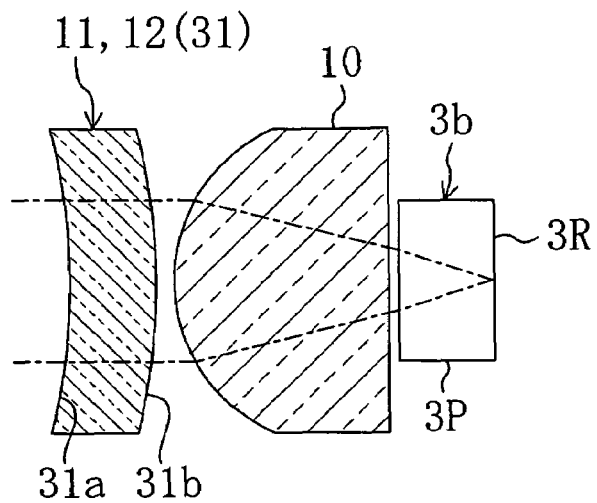
FIG. 14 is a schematic ray diagram of the objective optical system 2 of Specific Configuration 5 (Example 6) used in the optical pickup 1 where a laser beam of 780 nm wavelength is used.

Referring to FIGS. 12 to 14, explanation of Specific Configuration 4 of the two wavefront conversion elements 11 and 12 is provided.

FIG. 12 is a schematic ray diagram of an objective optical system 2 of Specific Configuration 4 used in an optical pickup 1 where a laser beam of 408 nm wavelength is used.

FIG. 13 is a schematic ray diagram of the objective optical system 2 of Specific Configuration 4 used in the optical pickup 1 where a laser beam of 660 nm wavelength is used.

FIG. 14 is a schematic ray diagram of the objective optical system 2 of Specific Configuration 4 used in the optical pickup 1 where a laser beam of 780 nm wavelength is used.

In Specific Configuration 4, two wavefront conversion elements 11 and 12 provided with wavefront conversion surfaces (wavefront conversion surfaces 11a and 11b), respectively, are integrated in one piece as a wavefront conversion element 31.

The wavefront conversion element 31 is made of a single lens with both surfaces thereof serving as wavefront conversion surfaces. To be more specific, the wavefront conversion element 31 includes a wavefront conversion surface 31b facing the objective lens 10 and another wavefront conversion surface 31a.

The wavefront conversion surfaces 31a and 31b perform wavefront conversion in response to the wavelength of the laser beam emitted from the light source 6 such that a 408 nm wavelength laser beam from the light source 6b is focused on the information recording surface 3R of the BD 3a as shown in FIG. 12, a 660 nm wavelength laser beam from the light source 6a is focused on the information recording surface 3R of the DVD 3c as shown in FIG. 13 and a 780 nm wavelength laser beam from the light source 6c is focused on the information recording surface 3R of the CD 3b as shown in FIG. 14.

Specifically, each of the wavefront conversion surfaces 31a and 31b has wavelength dependence and each of their wavefront conversion characteristics is varied in response to the wavelength of the laser beam emitted from the light source 6. Due to the change of the wavefront conversion characteristics of the wavefront conversion surfaces 31a and 31b, spherical aberration and coma aberration, which is caused by the refractive index of the objective lens 10 which varies in response to the wavelength of the laser beam emitted from the light source 6 and the difference in thickness between the cover layers 3P of different optical information recording media 3, are properly corrected.

Next, detailed explanation of how to make an aberration correction for various wavelengths in Specific Configuration 4 is provided.

As shown in FIG. 12, when the BD 3a is used, the light source 6b is selected to emit a 408 nm wavelength laser beam as a divergent ray. The laser beam from the light source 6b passes through the beam splitters 5a and 5b and transformed into a parallel light beam by the collimator 4. The parallel light beam passes through the beam splitter 7 and enters the wavefront conversion element 31.

In Specific Configuration 5, the wavefront conversion surfaces 31a and 31b without wavefront conversion allow the transmission of the 408 nm wavelength laser beam entered the wavefront conversion element 31. Therefore, the parallel light beam of 408 nm wavelength passes through the wavefront conversion element 31 without wavefront conversion.

As a result, the parallel light beam of 408 nm wavelength enters the objective lens 10. In Specific Configuration 5, the aberration of the objective lens 10 has been corrected such that the light beam of 408 nm wavelength is suitably focused on the information recording surface 3R of the BD 3a. Thus, an excellent spot is obtained on the information recording surface 3R of the BD 3a with reduced spherical aberration and coma aberration.

Referring to FIG. 13, when the DVD 3c is used, the light source 6a is selected to emit a 660 nm wavelength laser beam as a divergent ray. The laser beam from the light source 6a passes through the beam splitters 5a and 5b and transformed into a parallel light beam by the collimator 4. The parallel light beam passes through the beam splitter 7 and enters the wavefront conversion element 31. The wavefront conversion surfaces 31a and 31b convert the wavefront shape of the 660 nm wavelength laser beam entered the wavefront conversion element 31 such that the laser beam passed through the objective lens 10 is suitably focused on the information recording surface 3R of the DVD 3c.

As a result, an excellent spot is formed on the information recording surface 3R of the DVD 3c with reduced spherical aberration and coma aberration by the function of the objective lens 10.

Referring to FIG. 14, when the CD 3b is used, the light source 6c is selected to emit a 780 nm wavelength laser beam as a divergent ray. The laser beam from the light source 6c passes through the beam splitters 5a and 5b and transformed into a parallel light beam by the collimator 4. The parallel light beam passes through the beam splitter 7 and enters the wavefront conversion element 31. The wavefront conversion surfaces 31a and 31b convert the wavefront shape of the 780 nm wavelength laser beam entered the wavefront conversion element 31 such that the laser beam passed through the objective lens 10 is suitably focused on the information recording surface 3R of the CD 3b.

As a result, an excellent spot is formed on the information recording surface 3R of the CD 3b with reduced spherical aberration and coma aberration by the function of the objective lens 10.

EXAMPLES

Hereinafter, more detailed explanation of specific optical configurations of an objective optical system for use in an optical pickup according to the present invention is provided. Examples 1 to 6 described below are numeric embodiments of the objective optical systems of Specific Configurations 1 to 5 described above. The wavefront conversion elements and the objective lenses 10 used in the following examples are the same as those used in Specific Configurations 1 to 5 (FIGS. 2 to 14).

In the construction data below, disc thickness (DT) is a thickness of the cover layer 3P of the optical information recording medium 3 (BD, DVD or CD). Surface number #j (j=1, 2, 3, . . . ) denotes the $j^{th}$ surface counted from the side near the light source 6.

Surfaces #9 and #10 of Example 1, #5 and #6 of Comparative Example, #7 and #8 of Example 2, #7 and #8 of Example 3, #7 and #8 of Example 4, #1 to #6 of Example 5 and #1 to #4 of Example 6 are aspherical surfaces defined by the following formula (7):

$$X = \frac{C_j h^2}{1 + \sqrt{1 - (1+k_j)C_j^2 h^2}} + \sum A_{j,n} h^n \quad (7)$$

wherein h is a height from the optical axis,

X is a distance from a point on an aspherical surface at the height h from the optical axis to a tangential plane at a vertex of the aspherical surface, $C_j$ is a curvature at a vertex of an aspherical surface of the $j^{th}$ surface (Cj=1/Rj, Rj is a radius of curvature), $k_j$ is a conic constant of the $j^{th}$ surface and $A_{j,n}$ is an $n^{th}$ order aspherical surface coefficient of the $j^{th}$ surface.

As to the surfaces #2 and #6 of Example 1, #2 of Comparative Example, #3 and #4 of Example 2, #3 and #4 of Example 3, #3 and #4 of Example 4 and #1 and #2 of Example 6, an additional amount of phase φ is defined by the following formula (8):

$$\phi(h) = M \sum_{i=1}^{\infty} P_{j,i} h^{2i} \quad (8)$$

wherein φ(h) is a phase function, h is a height from the optical axis, $A_{j,i}$ is an $i^{th}$ order phase function coefficient of the $j^{th}$ surface (unit: radian) and M is a diffraction order.

Example 1

FIG. 2 is a schematic ray diagram of an objective optical system 2 of Example 1 used in an optical pickup 1 where a laser beam of 405 nm wavelength is used.

FIG. 3 is a schematic ray diagram of the objective optical system 2 of Example 1 used in the optical pickup 1 where a laser beam of 780 nm wavelength is used.

Example 1 is a numeric embodiment of the objective optical system of Specific Configuration 1 described above.

Tables 1 to 4 show specific numeric values of Example 1.

TABLE 1

|  | BD | CD |
|---|---|---|
| WAVELENGTH (nm) | 405 | 780 |
| DIAMETER OF ENTRANCE PUPIL OF OBJECTIVE LENS 10 (APERTURE) (mm) | 3.4 | 2.5 |
| NA | 0.85 | 0.5 |
| FOCAL DISTANCE (mm) | 2.0 | 2.3 |
| WORKING DISTANCE (WD) (mm) | 0.4 | 0.1493 |
| DISC THICKNESS (DT) (mm) | 0.1 | 1.2 |

TABLE 2

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| # 0 | ∞ | ∞ | Air |  |
| # 1 | ∞ | 0.2000 | n1 |  |
| # 2 | ∞ | 0.5000 | n2 | DIFFRACTION SURFACE |
| # 3 | ∞ | 0.2000 | n3 |  |
| # 4 | ∞ | 0.1000 | Air |  |
| # 5 | ∞ | 0.2000 | n4 |  |
| # 6 | ∞ | 0.5000 | n5 |  |
| # 7 | ∞ | 0.2000 | n6 | DIFFRACTION SURFACE |
| # 8 | ∞ | 0.1000 | Air |  |
| # 9 | 1.6744 | 2.7195 | n7 | ASPHERICAL SURFACE |
| # 10 | 5.5318 | DW | Air | ASPHERICAL SURFACE |
| # 11 | ∞ | DT | disk |  |
| # 12 | ∞ |  |  |  |

TABLE 3

|  | WAVELENGTH(nm) | |
|---|---|---|
|  | 405 | 780 |
| n1 | 1.5200 | 1.5000 |
| n2 | 1.5200 | 1.3000 |
| n3 | 1.5200 | 1.5000 |
| n4 | 1.5200 | 1.5000 |
| n5 | 1.5200 | 1.3000 |
| n6 | 1.5200 | 1.5000 |
| n7 | 1.9000 | 1.8600 |
| disk | 1.6174 | 1.5722 |

TABLE 4

| #2 PHASE FUNCTION COEFFICIENT | | #6 PHASE FUNCTION COEFFICIENT | | #9 ASPHERICAL COEFFICIENT | | #10 ASPHERICAL COEFFICIENT | |
|---|---|---|---|---|---|---|---|
| P2, 0 | 0.00000 | P6, 0 | 0.00000 | C9 | 1.6744 | C10 | 5.5318 |
| P2, 2 | 373.87858 | P6, 2 | −48.77759 | k9 | −0.50924 | k10 | 0.00000 |
| P2, 4 | −35.57319 | P6, 4 | 25.81411 | A9, 4 | 0.00502 | A10, 4 | 0.29959 |
| P2, 6 | −6.26151 | P6, 6 | −4.51979 | A9, 6 | 0.00094 | A10, 6 | −0.87853 |
| P2, 8 | −26.00055 | P6, 8 | 85.68618 | A9, 8 | 0.00018 | A10, 8 | 1.22509 |
| P2, 10 | −49.64912 | P6, 10 | −57.01860 | A9, 10 | 0.00003 | A10, 10 | −0.68942 |
| P2, 12 | 13.27007 | P6, 12 | −0.90079 |  |  |  |  |
| P2, 14 | 17.89892 | P6, 14 | 58.71974 |  |  |  |  |
| P2, 16 | −5.25400 | P6, 16 | −29.37691 |  |  |  |  |

Figure 15:
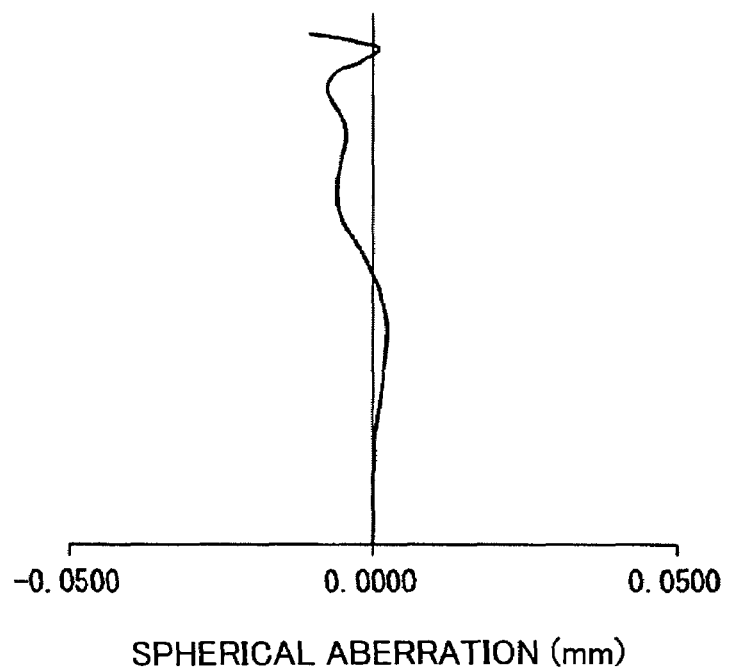
FIG. 15 is a graph illustrating a spherical aberration of Example 1 (wavelength: 405 mm, thickness of cover layer 3P: 0.1 mm).

FIG. 15 shows a spherical aberration of Example 1 (wavelength: 405 nm, thickness of the cover layer 3P: 0.1 mm).

Figure 16:
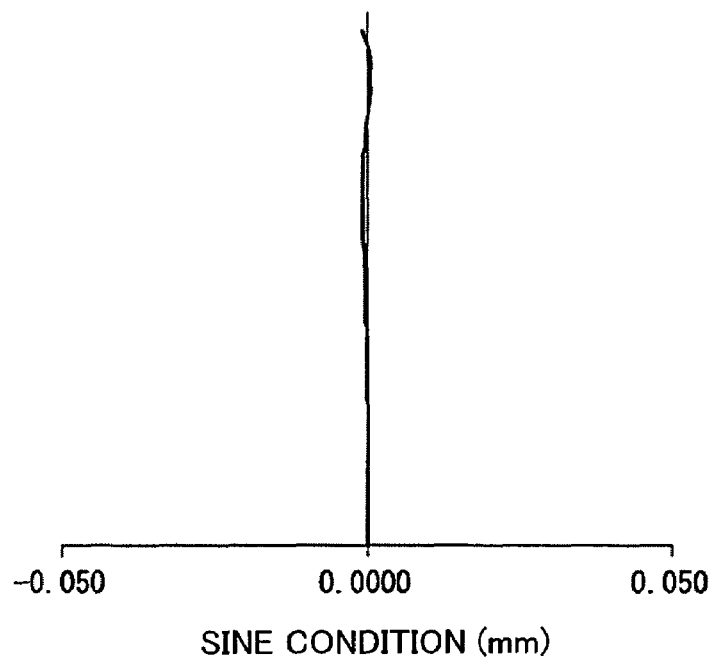
FIG. 16 is a graph illustrating an offence against the sine condition of Example 1 (wavelength: 405 nm, thickness of cover layer 3P: 0.1 mm).

FIG. 16 shows an offence against the sine condition of Example 1 (wavelength: 405 nm, thickness of the cover layer 3P: 0.1 mm).

Figure 17:
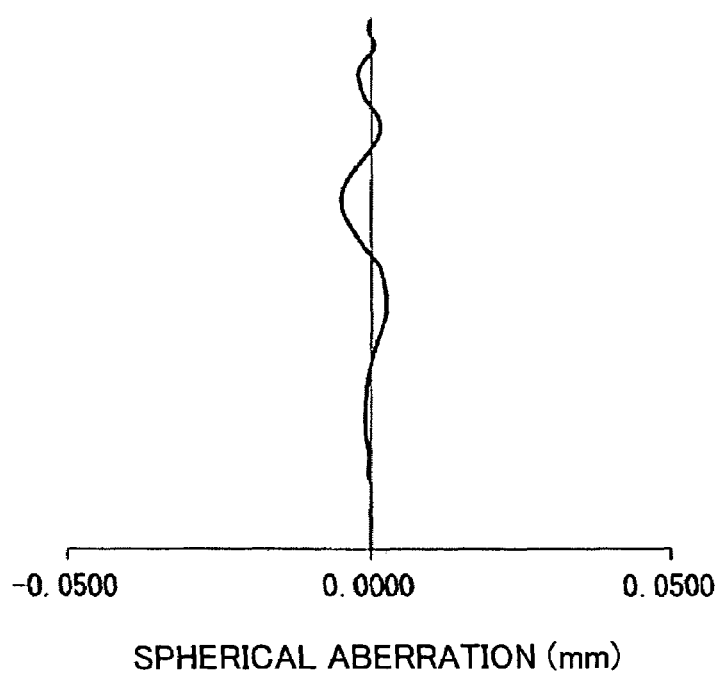
FIG. 17 is a graph illustrating a spherical aberration of Example 1 (wavelength: 780 nm, thickness of cover layer 3P: 1.2 mm).

FIG. 17 shows a spherical aberration of Example 1 (wavelength: 780 nm, thickness of the cover layer 3P: 1.2 mm).

Figure 18:
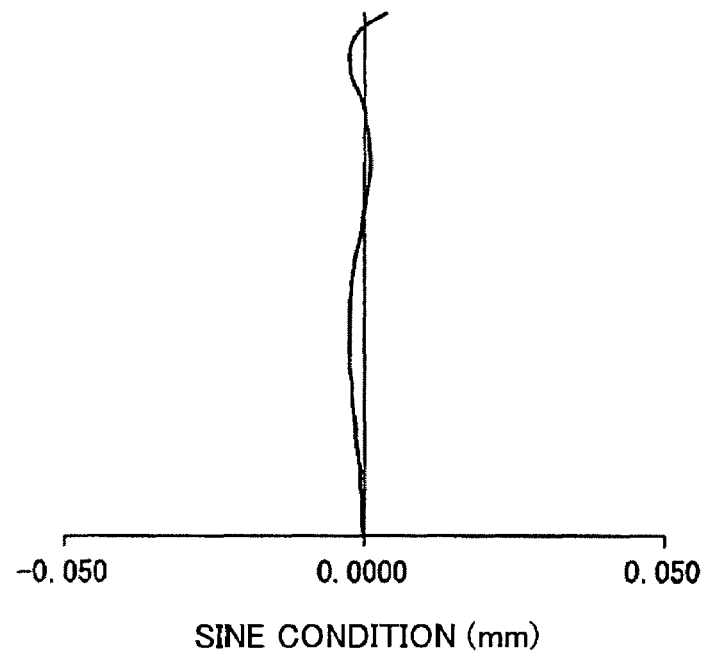
FIG. 18 is a graph illustrating an offence against the sine condition of Example 1 (wavelength: 780 nm, thickness of cover layer 3P: 1.2 mm).

FIG. 18 shows an offence against the sine condition of Example 1 (wavelength: 780 nm, thickness of the cover layer 3P: 1.2 mm).

In Example 1, $|SC_{MAX}|$ in the region where the light beam passes through was:

BD: $3.8 \times 10^{-4}$

CD: $1.8 \times 10^{-3}$

The wavefront aberration with respect to an on-axis incident light beam when the CD was used was 2 m$\lambda$ in RMS ($\lambda$: wavelength). The wavefront aberration with respect to a 1 degree off-axis light beam was 46 m$\lambda$ in RMS.

Comparative Example

An optical pickup was formed in the same manner as Example 1 except that the second wavefront conversion element 12 is not formed.

Tables 5 and 6 and Tables 1 and 3 shown above indicate specific numeric values of Comparative Example.

TABLE 5

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| #0 | ∞ | ∞ | Air | |
| #1 | ∞ | 0.2000 | n1 | |
| #2 | ∞ | 0.5000 | n2 | DIFFRACTION SURFACE |
| #3 | ∞ | 0.2000 | n3 | |
| #4 | ∞ | 0.1000 | Air | |
| #5 | 1.6744 | 2.7195 | n7 | ASPHERICAL SURFACE |
| #6 | 5.5318 | DW | Air | ASPHERICAL SURFACE |
| #7 | ∞ | DT | disk | |
| #8 | ∞ | | | |

TABLE 6

| #2 PHASE FUNCTION COEFFICIENT | | #5 ASPHERICAL COEFFICIENT | | #6 ASPHERICAL COEFFICIENT | |
|---|---|---|---|---|---|
| P2,0 | 0.00000 | C9 | 1.6744 | C10 | 5.5318 |
| P2,2 | 285.39358 | k9 | −0.50924 | k10 | 0.00000 |
| P2,4 | −2.62924 | A9,4 | 0.00502 | A10,4 | 0.29959 |
| P2,6 | 4.23648 | A9,6 | 0.00094 | A10,6 | −0.87853 |
| P2,8 | 10.26970 | A9,8 | 0.00018 | A10,8 | 1.22509 |
| P2,10 | −6.34033 | A9,10 | 0.00003 | A10,10 | −0.68942 |
| P2,12 | 0.75704 | | | | |
| P2,14 | 0.90278 | | | | |
| P2,16 | −0.24874 | | | | |

Figure 19:
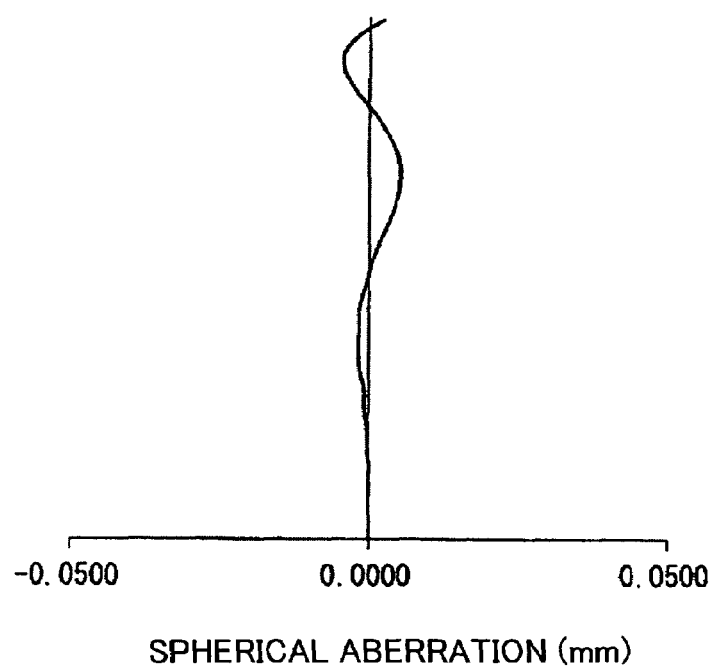
FIG. 19 is a graph illustrating a spherical aberration of Comparative Example (wavelength: 780 nm, thickness of cover layer 3P: 1.2 mm).

FIG. 19 shows a spherical aberration of Comparative Example (wavelength: 780 nm, thickness of the cover layer 3P: 1.2 mm).

Figure 20:
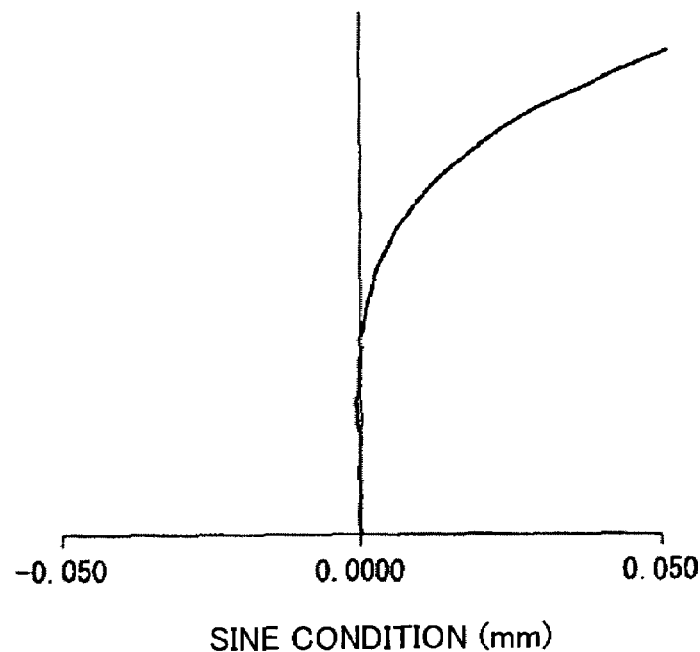
FIG. 20 is a graph illustrating an offence against the sine condition of Comparative Example (wavelength: 780 nm, thickness of cover layer 3P: 1.2 mm).

FIG. 20 shows an offence against the sine condition of Comparative Example (wavelength: 780 nm, thickness of the cover layer 3P: 1.2 mm).

In Comparative Example, $|SC_{MAX}|$ in the region where the light beam passes through was:

CD: $2.9 \times 10^{-2}$

The wavefront aberration with respect to an on-axis incident light beam when the CD was used was 3 mλ in RMS (λ: wavelength). The wavefront aberration with respect to a 1 degree off-axis light beam was 281 mλ in RMS.

Example 2

FIG. 4 is a schematic ray diagram of an objective optical system 2 of Example 2 used in an optical pickup 1 where a laser beam of 405 nm wavelength is used.

FIG. 5 is a schematic ray diagram of the objective optical system 2 of Example 2 used in the optical pickup 1 where a laser beam of 780 nm wavelength is used.

Example 2 is a numeric embodiment of the objective optical system of Specific Configuration 2 described above.

Tables 7 to 10 show specific numeric values of Example 2.

TABLE 7

| | BD | CD |
|---|---|---|
| WAVELENGTH (nm) | 405 | 780 |
| DIAMETER OF ENTRANCE PUPIL OF OBJECTIVE LENS 10 (APERTURE) (mm) | 3.4 | 2.5 |
| NA | 0.85 | 0.5 |
| FOCAL DISTANCE (mm) | 2.0 | 2.4 |
| WORKING DISTANCE (WD) (mm) | 0.4 | 0.1496 |
| DISC THICKNESS (DT) (mm) | 0.1 | 1.2 |

TABLE 8

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| #0 | ∞ | ∞ | Air | |
| #1 | ∞ | 0.2000 | n1 | |
| #2 | ∞ | 0.5000 | n2 | |
| #3 | ∞ | 1.0000 | n3 | DIFFRACTION SURFACE |
| #4 | ∞ | 0.5000 | n4 | DIFFRACTION SURFACE |
| #5 | ∞ | 0.2000 | n5 | |
| #6 | ∞ | 0.1000 | Air | |
| #7 | 1.6744 | 2.7195 | n6 | ASPHERICAL SURFACE |
| #8 | 5.5318 | WD | Air | ASPHERICAL SURFACE |
| #9 | ∞ | DT | disk | |
| #10 | ∞ | | | |

TABLE 9

| | WAVELENGTH (nm) | |
|---|---|---|
| | 405 | 780 |
| n1 | 1.5200 | 1.5000 |
| n2 | 1.5200 | 1.3000 |
| n3 | 1.5200 | 1.5000 |
| n4 | 1.5200 | 1.3000 |
| n5 | 1.5200 | 1.5000 |
| n6 | 1.9000 | 1.8600 |
| disk | 1.6174 | 1.5722 |

TABLE 10

| #3 PHASE FUNCTION COEFFICIENT | | #4 ASPHERICAL COEFFICIENT | | #7 ASPHERICAL COEFFICIENT | | #8 ASPHERICAL COEFFICIENT | |
|---|---|---|---|---|---|---|---|
| P3, 0 | 0.00000 | P4, 0 | 0.00000 | C9 | 1.6744 | C10 | 5.5318 |
| P3, 2 | 181.4325 | P4, 2 | 124.81846 | k9 | −0.50924 | k10 | 0.00000 |
| P3, 4 | −33.6387 | P4, 4 | 26.41758 | A9, 4 | 0.00502 | A10, 4 | 0.29959 |
| P3, 6 | −25.6097 | P4, 6 | 33.25381 | A9, 6 | 0.00094 | A10, 6 | −0.87853 |
| P3, 8 | −28.6912 | P4, 8 | 31.01917 | A9, 8 | 0.00018 | A10, 8 | 1.22509 |
| P3, 10 | −20.3048 | P4, 10 | 5.91233 | A9, 10 | 0.00003 | A10, 10 | −0.68942 |
| P3, 12 | 9.100494 | P4, 12 | −5.84843 | | | | |
| P3, 14 | 8.862588 | P4, 14 | 19.46808 | | | | |
| P3, 16 | −3.38 | P4, 16 | −11.02387 | | | | |

Figure 21:
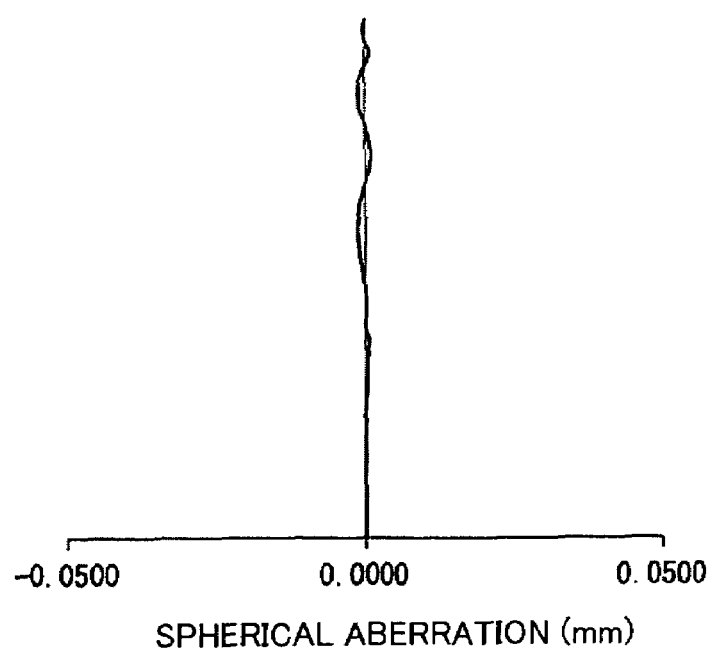
FIG. 21 is a graph illustrating a spherical aberration of Example 2 (wavelength: 780 nm, thickness of cover layer 3P: 1.2 mm).

FIG. 21 shows a spherical aberration of Example 2 (wavelength: 780 nm, thickness of the cover layer 3P: 1.2 mm).

Figure 22:
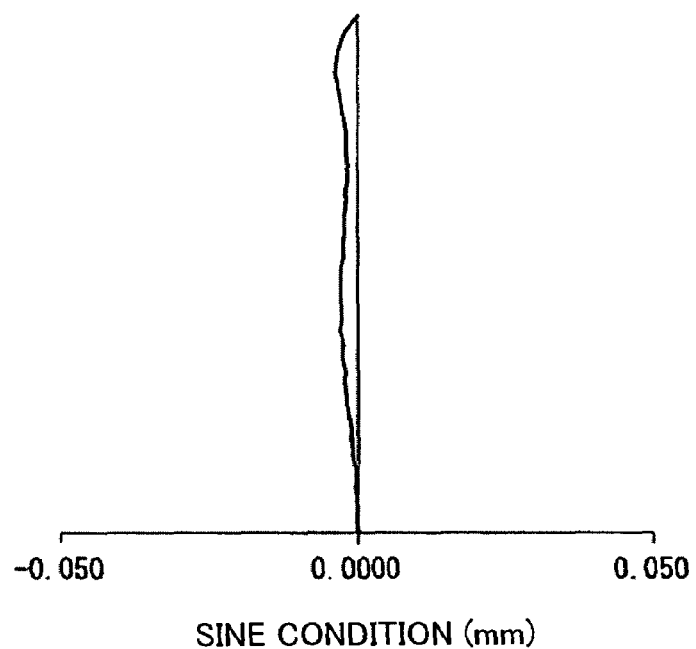
FIG. 22 is a graph illustrating an offence against the sine condition of Example 2 (wavelength: 780 nm, thickness of cover layer 3P: 1.2 mm).

FIG. 22 shows an offence against the sine condition of Example 2 (wavelength: 780 nm, thickness of the cover layer 3P: 1.2 mm).

In Example 2, $|SC_{MAX}|$ in the region where the light beam passes through was:

CD: $1.4 \times 10^{-3}$

The wavefront aberration with respect to an on-axis incident light beam when the CD was used was 1 mλ in RMS (λ: wavelength). The wavefront aberration with respect to a 1 degree off-axis light beam was 47 mλ in RMS.

Example 3

The configuration of Example 3 is the same as that of Example 2.

Tables 11 to 13 and Table 9 shown above indicate specific numeric values of Example 3.

TABLE 11

| | BD | CD |
|---|---|---|
| WAVELENGTH (nm) | 405 | 780 |
| DIAMETER OF ENTRANCE PUPIL OF OBJECTIVE LENS 10 (APERTURE) (mm) | 3.4 | 2.2 |
| NA | 0.85 | 0.5 |
| FOCAL DISTANCE (mm) | 2.0 | 2.2 |
| WORKING DISTANCE (WD) (mm) | 0.4 | 0.1496 |
| DISC THICKNESS (DT) (mm) | 0.1 | 1.2 |

TABLE 12

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| # 0 | ∞ | ∞ | Air | |
| # 1 | ∞ | 0.2000 | n1 | |
| # 2 | ∞ | 0.5000 | n2 | |
| # 3 | ∞ | 0.2000 | n3 | DIFFRACTION SURFACE |
| # 4 | ∞ | 0.5000 | n4 | DIFFRACTION SURFACE |
| # 5 | ∞ | 0.2000 | n5 | |
| # 6 | ∞ | 0.1000 | Air | |
| # 7 | 1.6744 | 2.7195 | n6 | ASPHERICAL SURFACE |
| # 8 | 5.5318 | WD | Air | ASPHERICAL SURFACE |
| # 9 | ∞ | DT | disk | |
| # 10 | ∞ | | | |

TABLE 13

| #3 PHASE FUNCTION COEFFICIENT | | #4 PHASE FUNCTION COEFFICIENT | | #7 ASPHERICAL COEFFICIENT | | #8 ASPHERICAL COEFFICIENT | |
|---|---|---|---|---|---|---|---|
| P3, 0  | 0.00000   | P4, 0  | 0.00000   | C9    | 1.6744   | C10    | 5.5318   |
| P3, 2  | 407.61261 | P4, 2  | −241.86333| k9    | −0.50924 | k10    | 0.00000  |
| P3, 4  | −156.88223| P4, 4  | 141.33058 | A9, 4 | 0.00502  | A10, 4 | 0.29959  |
| P3, 6  | −11.26408 | P4, 6  | 9.23584   | A9, 6 | 0.00094  | A10, 6 | −0.87853 |
| P3, 8  | −6.84805  | P4, 8  | 8.31536   | A9, 8 | 0.00018  | A10, 8 | 1.22509  |
| P3, 10 | 0.00000   | P4, 10 | 0.00000   | A9, 10| 0.00003  | A10, 10| −0.68942 |
| P3, 12 | 0.00000   | P4, 12 | 0.00000   |       |          |        |          |
| P3, 14 | 0.00000   | P4, 14 | 0.00000   |       |          |        |          |
| P3, 16 | 0.00000   | P4, 16 | 0.00000   |       |          |        |          |

Figure 23:
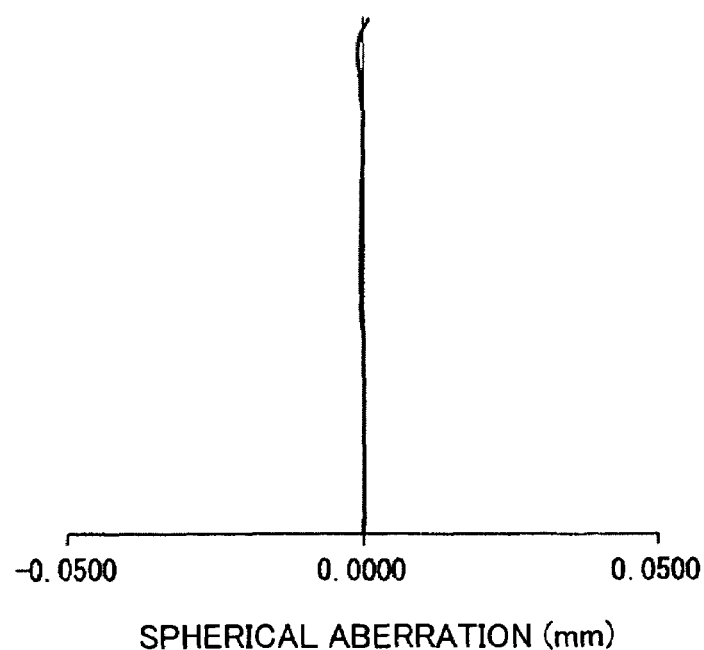
FIG. 23 is a graph illustrating a spherical aberration of Example 3 (wavelength: 780 nm, thickness of cover layer 3P: 1.2 mm).

FIG. 23 shows a spherical aberration of Example 3 (wavelength: 780 nm, thickness of the cover layer 3P: 1.2 mm).

Figure 24:
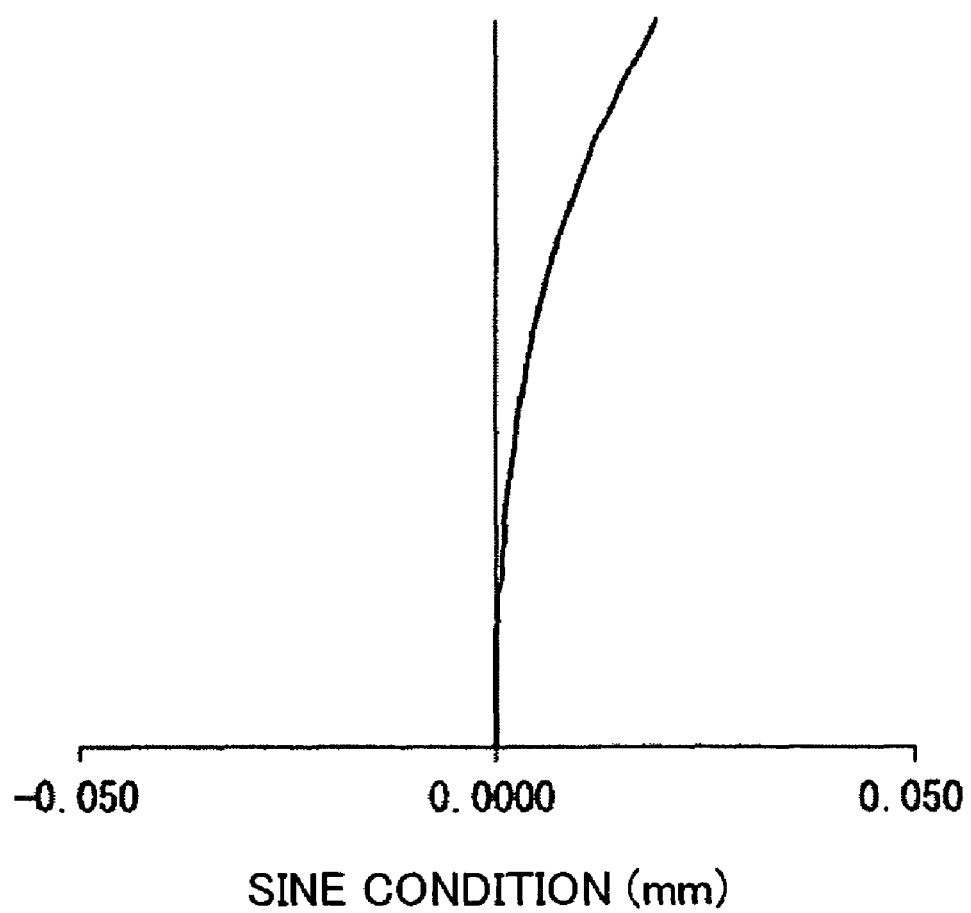
FIG. 24 is a graph illustrating an offence against the sine condition of Example 3 (wavelength: 780 nm, thickness of cover layer 3P: 1.2 mm).

FIG. 24 shows an offence against the sine condition of Example 3 (wavelength: 780 nm, thickness of the cover layer 3P: 1.2 mm).

In Example 3, $|SC_{MAX}|$ in the region where the light beam passes through was:

CD: $8.7 \times 10^{-3}$

The wavefront aberration with respect to an on-axis incident light beam when the CD was used was 0 mλ in RMS (λ: wavelength). The wavefront aberration with respect to a 1 degree off-axis light beam was 61 mλ in RMS.

Example 4

FIG. 6 is a schematic ray diagram of an objective optical system 2 used in an optical pickup 1 of Example 4 where a 408 nm wavelength laser beam is used.

FIG. 7 is a schematic ray diagram of the objective optical system 2 of Example 4 used in the optical pickup 1 where a laser beam of 660 nm wavelength is used.

FIG. 8 is a schematic ray diagram of the objective optical system 2 of Example 4 used in the optical pickup 1 where a laser beam of 780 nm wavelength is used.

In Example 4, the optical configuration of the objective optical system of Specific Configuration 3 described above is achieved as a numerical example.

Tables 14 to 17 show specific numeric values of Example 4.

TABLE 14

|  | BD | DVD | CD |
|---|---|---|---|
| WAVELENGTH (nm) | 408 | 660 | 780 |
| DIAMETER OF ENTRANCE PUPIL OF OBJECTIVE LENS 10 (APERTURE) | 3.4 | 3 | 2.4 |
| NA | 0.85 | 0.6 | 0.47 |
| WORKING DISTANCE (WD) (mm) | 0.6 | 0.5 | 0.2 |
| DISC THICKNESS (DT) (mm) | 0.085 | 0.6 | 1.2 |

TABLE 15

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| #0  | ∞         | ∞       | Air  |  |
| #1  | ∞         | 0.20000 | n1   |  |
| #2  | ∞         | 0.50000 | n2   |  |
| #3  | ∞         | 1.00000 | n3   | DIFFRACTION SURFACE |
| #4  | ∞         | 0.50000 | n4   | DIFFRACTION SURFACE |
| #5  | ∞         | 0.20000 | n5   |  |
| #6  | ∞         | 0.10000 | Air  |  |
| #7  | 1.58065   | 2.43396 | n6   | ASPHERICAL SURFACE |
| #8  | −31.11271 | WD      | Air  | ASPHERICAL SURFACE |
| #9  | ∞         | DT      | disc |  |
| #10 | ∞         |         |      |  |

TABLE 16

|  | WAVELENGTH (nm) | | |
|---|---|---|---|
|  | 780 | 660 | 408 |
| n1 | 1.511183 | 1.514207 | 1.529817 |
| n2 | 1.533000 | 1.538000 | 1.529817 |
| n3 | 1.511183 | 1.514207 | 1.529817 |
| n4 | 1.533000 | 1.538000 | 1.529817 |
| n5 | 1.511183 | 1.514207 | 1.529817 |
| n6 | 1.739003 | 1.744849 | 1.777719 |
| disk | 1.572207 | 1.578152 | 1.616416 |

TABLE 17

| #3 | | #4 | |
|---|---|---|---|
| ASPHERICAL COEFFICIENT | PHASE FUNCTION COEFFICIENT | ASPHERICAL COEFFICIENT | PHASE FUNCTION COEFFICIENT |
| RD 0.000000 | P2 $-3.761175 \times 10^2$ | RD 0.000000 | P2 $5.992101 \times 10^2$ |
| CC 0.000000 | P4 $-1.049051 \times 10^2$ | CC 0.000000 | P4 $1.305301 \times 10^2$ |
| A4 0.000000 | P6 $-4.066457 \times 10^{-1}$ | A4 0.000000 | P6 $1.203718 \times 10$ |
| A6 0.000000 | P8 1.011698 | A6 0.000000 | P8 $-1.448114$ |
| A8 0.000000 | P10 0.000000 | A8 0.000000 | P10 0.000000 |
| A10 0.000000 | P12 0.000000 | A10 0.000000 | P12 0.000000 |
| A12 0.000000 | P14 0.000000 | A12 0.000000 | P14 0.000000 |
| A14 0.000000 | P16 0.000000 | A14 0.000000 | P16 0.000000 |
| A16 0.000000 | P18 0.000000 | A16 0.000000 | |

| #7 ASPHERICAL COEFFICIENT | | #8 ASPHERICAL COEFFICIENT | |
|---|---|---|---|
| RD | 1.580650 | RD | $-3.111271 \times 10$ |
| CC | $-4.201021 \times 10^{-1}$ | CC | 0.000000 |
| A4 | $3.679823 \times 10^{-4}$ | A4 | $1.252100 \times 10^{-1}$ |
| A6 | $-3.314383 \times 10^{-4}$ | A6 | $-1.501588 \times 10^{-1}$ |
| A8 | $2.353649 \times 10^{-4}$ | A8 | $1.113056 \times 10^{-2}$ |
| A10 | $-1.116006 \times 10^{-4}$ | A10 | $9.254931 \times 10^{-2}$ |
| A12 | $-1.221845 \times 10^{-4}$ | A12 | $-6.771517 \times 10^{-2}$ |
| A14 | $8.575418 \times 10^{-5}$ | A14 | $1.291899 \times 10^{-2}$ |
| A16 | $-2.310863 \times 10^{-5}$ | A16 | $1.529451 \times 10^{-3}$ |

Figure 25:
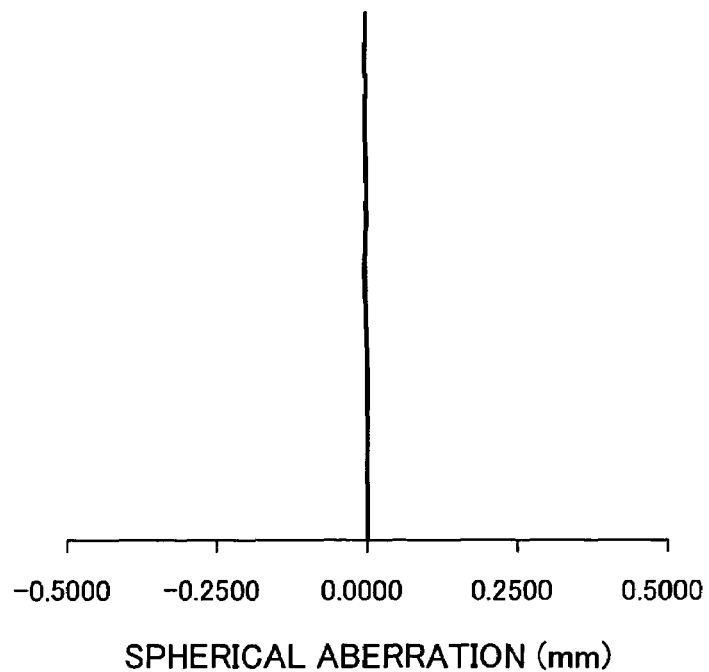
FIG. 25 is a graph illustrating a spherical aberration of Example 4 (wavelength: 408 nm, thickness of cover layer 3P: 0.085 mm).

FIG. 25 shows a spherical aberration of Example 4 (wavelength: 408 mm, thickness of the cover layer 3P: 0.085 mm).

Figure 26:
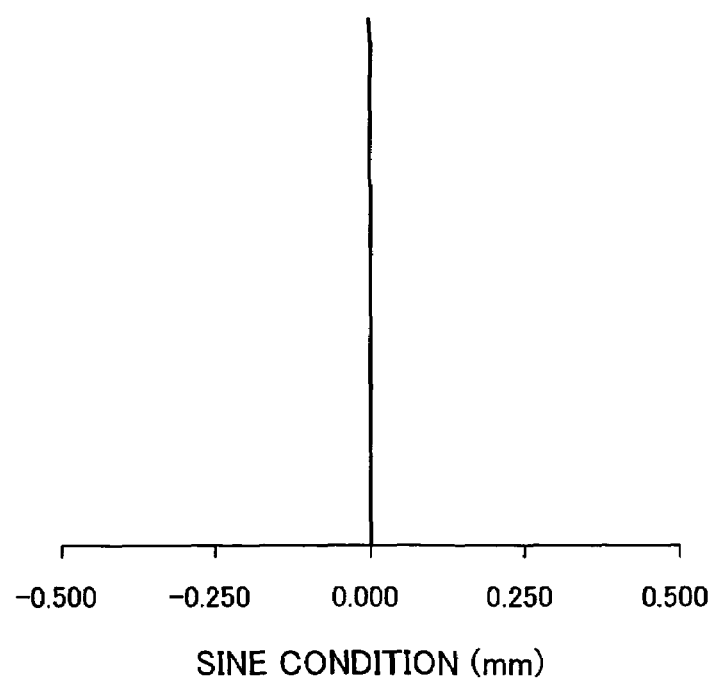
FIG. 26 is a graph illustrating an offence against the sine condition of Example 4 (wavelength: 408 nm, thickness of cover layer 3P: 0.085 mm).

FIG. 26 shows an offence against the sine condition of Example 4 (wavelength: 408 nm, thickness of the cover layer 3P: 0.085 mm).

Figure 27:
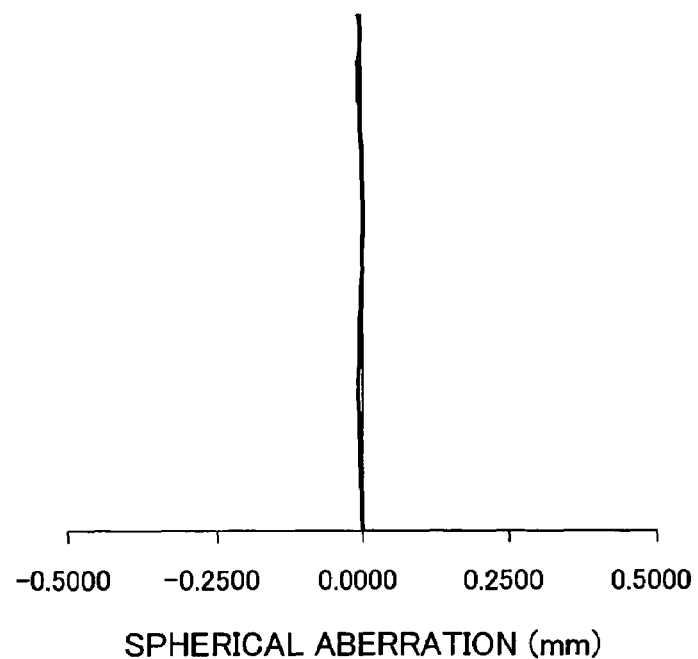
FIG. 27 is a graph illustrating a spherical aberration of Example 4 (wavelength: 660 nm, thickness of cover layer 3P: 0.6 mm).

FIG. 27 shows a spherical aberration of Example 4 (wavelength: 660 mm, thickness of the cover layer 3P: 0.6 mm).

Figure 28:
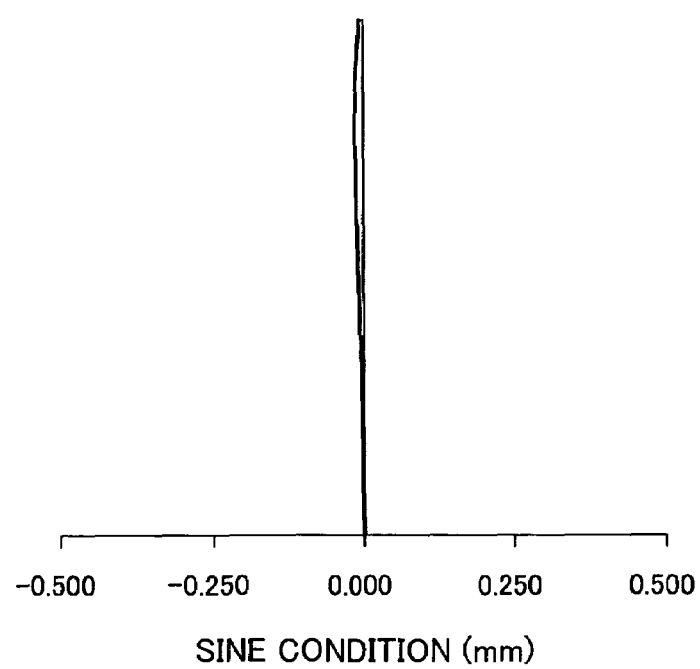
FIG. 28 is a graph illustrating an offence against the sine condition of Example 4 (wavelength: 660 nm, thickness of cover layer 3P: 0.6 mm).

FIG. 28 shows an offence against the sine condition of Example 4 (wavelength: 660 mm, thickness of the cover layer 3P: 0.6 mm).

Figure 29:
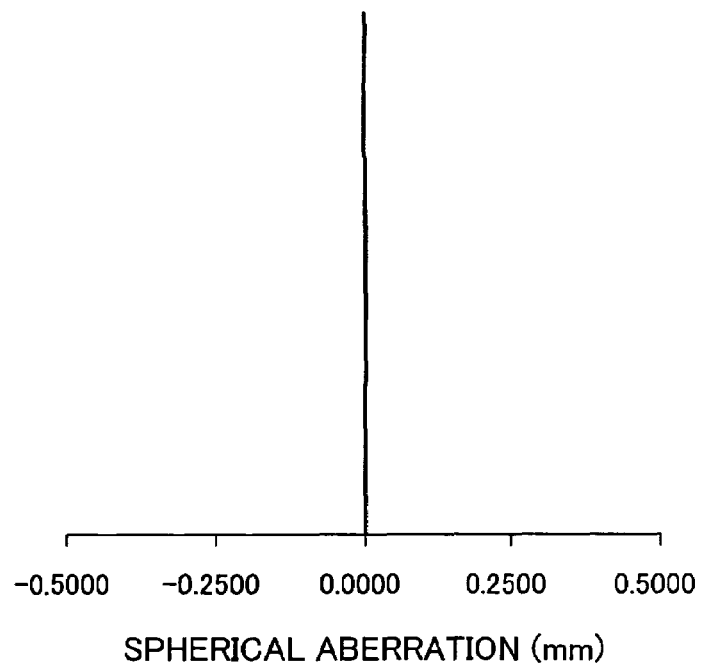
FIG. 29 is a graph illustrating a spherical aberration of Example 4 (wavelength: 780 nm, thickness of cover layer 3P: 1.2 mm).

FIG. 29 shows a spherical aberration of Example 4 (wavelength 780 mm, thickness of the cover layer 3P: 1.2 mm).

Figure 30:
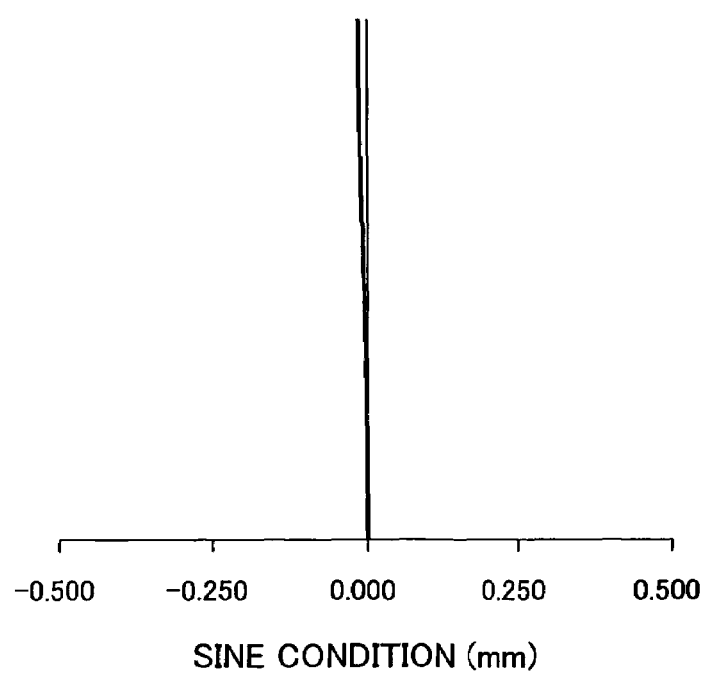
FIG. 30 is a graph illustrating an offence against the sine condition of Example 4 (wavelength: 780 nm, thickness of cover layer 3P: 1.2 mm).

FIG. 30 shows an offence against the sine condition of Example 4 (wavelength: 780 nm, thickness of the cover layer 3P: 1.2 mm).

Table 18 shows the aberration with respect to an on-axis incident light beam. Table 19 shows the aberration with respect to a 0.5 degree off-axis light beam.

TABLE 18

| | RMS | THIRD-ORDER SPHERICAL | FIFTH-ORDER SPHERICAL | (UNIT: mλ) HIGHER ORDER |
|---|---|---|---|---|
| BD | 1.0 | 0.2 | −0.1 | 1.0 |
| DVD | 2.6 | −1.6 | 1.3 | 1.6 |
| CD | 0.9 | 0.1 | 0.1 | 0.4 |

TABLE 19

| | RMS | THIRD-ORDER COMA | FIFTH-ORDER COMA | (UNIT: mλ) HIGHER ORDER |
|---|---|---|---|---|
| BD | 23.1 | −3.3 | 1.9 | 8.9 |
| DVD | 39.8 | 17.1 | 32.5 | 4.0 |
| CD | 19.5 | −17.7 | 6.3 | 0.8 |

In Example 4, $|SC_{MAX}|$ in the region where the light beam passes through was:

BD: 0.002

DVD: 0.014

CD: 0.015

Example 5

FIG. 9 is a schematic ray diagram of an objective optical system 2 of Example 5 used in an optical pickup 1 where a laser beam of 408 nm wavelength is used.

FIG. 10 is a schematic ray diagram of the objective optical system 2 of Example 5 used in the optical pickup 1 where a laser beam of 660 nm wavelength is used.

FIG. 11 is a schematic ray diagram of the objective optical system 2 of Example 5 used in the optical pickup 1 where a laser beam of 780 nm wavelength is used.

Example 5 is a numeric embodiment of the objective optical system of Specific Configuration 4 described above.

Tables 20 to 23 show specific numeric values of Example 5.

TABLE 20

| | BD | DVD | CD |
|---|---|---|---|
| WAVELENGTH (nm) | 408 | 660 | 780 |
| DIAMETER OF ENTRANCE PUPIL OF OBJECTIVE LENS 10 (APERTURE) | 3.4 | 2.5 | 1.9 |
| NA | 0.85 | 0.6 | 0.44 |
| WORKING DISTANCE (WD) (mm) | 0.6 | 0.43 | 0.1 |
| DISC THICKNESS (DT) (mm) | 0.085 | 0.6 | 1.2 |

TABLE 21

| SURFACE NUMBER | RADIUS OF CURVATURE AT VERTEX (mm) | THICKNESS (mm) | REFRACTIVE INDEX OF MATERIAL | REMARKS |
|---|---|---|---|---|
| #0 | ∞ | ∞ | Air | |
| #1 | 218.48581 | 0.50000 | n1 | ASPHERICAL SURFACE |
| #2 | −1.88318 | 1.00000 | n2 | ASPHERICAL SURFACE |
| #3 | −1.82452 | 0.30000 | n3 | ASPHERICAL SURFACE |
| #4 | 2654.44986 | 0.10000 | Air | ASPHERICAL SURFACE |
| #5 | 1.58065 | 2.43396 | n4 | ASPHERICAL SURFACE |
| #6 | −31.11271 | WD | | ASPHERICAL SURFACE |
| #7 | ∞ | DT | disc | |
| #8 | ∞ | | | |

TABLE 22

| | WAVELENGTH (nm) | | |
|---|---|---|---|
| | 780 | 660 | 408 |
| n1 | 1.478245 | 1.486177 | 1.539407 |
| n2 | 1.459124 | 1.467371 | 1.523214 |
| n3 | 1.527532 | 1.530119 | 1.542669 |
| n4 | 1.739003 | 1.744849 | 1.777719 |
| disk | 1.572207 | 1.578152 | 1.616416 |

TABLE 23

| | #1 ASPHERICAL COEFFICIENT | | #2 PHASE FUNCTION COEFFICIENT | | #3 ASPHERICAL COEFFICIENT |
|---|---|---|---|---|---|
| RD | $2.184858 \times 10^2$ | RD | $-1.883176$ | RD | $-1.824520$ |
| CC | 0.000000 | CC | $-1.749437 \times 10^{-2}$ | CC | $-1.236933 \times 10^{-2}$ |
| A4 | $1.150771 \times 10^{-4}$ | A4 | $7.435158 \times 10^{-2}$ | A4 | $6.262409 \times 10^{-2}$ |
| A6 | $9.531784 \times 10^{-5}$ | A6 | $-7.035194 \times 10^{-3}$ | A6 | $-1.157362 \times 10^{-3}$ |
| A8 | $1.326244 \times 10^{-6}$ | A8 | $-4.236187 \times 10^{-3}$ | A8 | $-5.310299 \times 10^{-3}$ |
| A10 | $-1.328032 \times 10^{-5}$ | A10 | $2.487658 \times 10^{-3}$ | A10 | $2.076741 \times 10^{-3}$ |
| A12 | $-3.470447 \times 10^{-6}$ | A12 | $7.898471 \times 10^{-5}$ | A12 | $5.915084 \times 10^{-4}$ |
| A14 | 0.000000 | A14 | 0.000000 | A14 | 0.000000 |
| A16 | 0.000000 | A16 | 0.000000 | A16 | 0.000000 |

| | #4 ASPHERICAL COEFFICIENT | | #5 ASPHERICAL COEFFICIENT | | #6 ASPHERICAL COEFFICIENT |
|---|---|---|---|---|---|
| RD | $2.654450 \times 10^3$ | RD | $1.580650$ | RD | $-3.111271 \times 10$ |
| CC | 0.000000 | CC | $-4.201021 \times 10^{-1}$ | CC | 0.000000 |
| A4 | $5.531050 \times 10^{-4}$ | A4 | $3.679823 \times 10^{-4}$ | A4 | $1.252100 \times 10^{-1}$ |
| A6 | $-1.579533 \times 10^{-4}$ | A6 | $-3.314383 \times 10^{-4}$ | A6 | $-1.501588 \times 10^{-1}$ |
| A8 | $-3.048139 \times 10^{-5}$ | A8 | $2.353649 \times 10^{-4}$ | A8 | $1.113056 \times 10^{-2}$ |
| A10 | $1.743082 \times 10^{-5}$ | A10 | $-1.116006 \times 10^{-4}$ | A10 | $9.254931 \times 10^{-2}$ |
| A12 | $7.126624 \times 10^{-6}$ | A12 | $-1.221845 \times 10^{-4}$ | A12 | $-6.771517 \times 10^{-2}$ |
| A14 | 0.000000 | A14 | $8.575418 \times 10^{-5}$ | A14 | $1.291899 \times 10^{-2}$ |
| | | A16 | $-2.310863 \times 10^{-5}$ | A16 | $1.529451 \times 10^{-3}$ |

Figure 31:
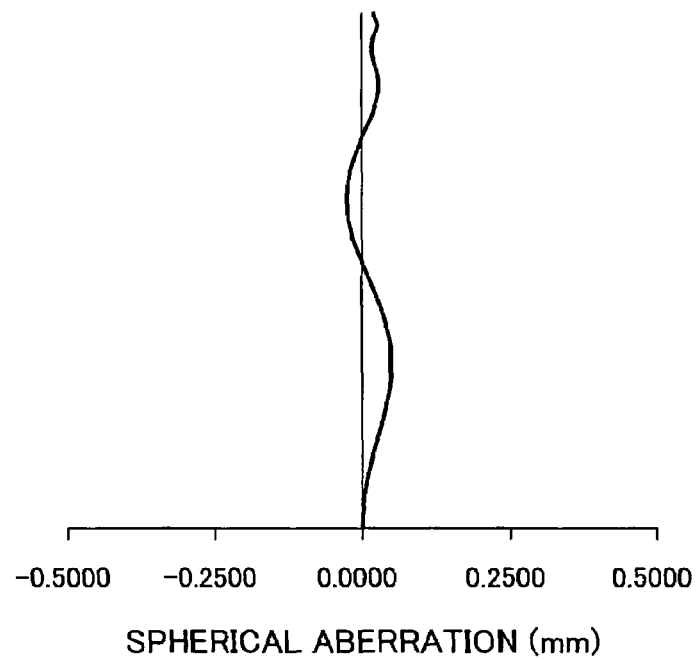
FIG. 31 is a graph illustrating a spherical aberration of Example 5 (wavelength: 408 nm, thickness of cover layer 3P: 0.085 mm).

FIG. 31 shows a spherical aberration of Example 5 (wavelength: 408 nm, thickness of the cover layer 3P: 0.085 mm).

Figure 32:
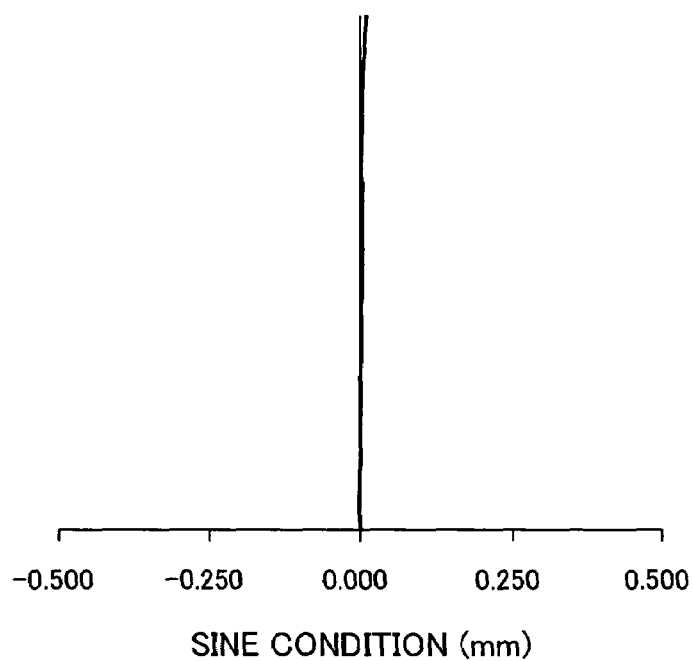
FIG. 32 is a graph illustrating an offence against the sine condition of Example 5 (wavelength: 408 nm, thickness of cover layer 3P: 0.085 mm).

FIG. 32 shows an offence against the sine condition of Example 5 (wavelength: 408 nm, thickness of the cover layer 3P: 0.085 mm).

Figure 33:
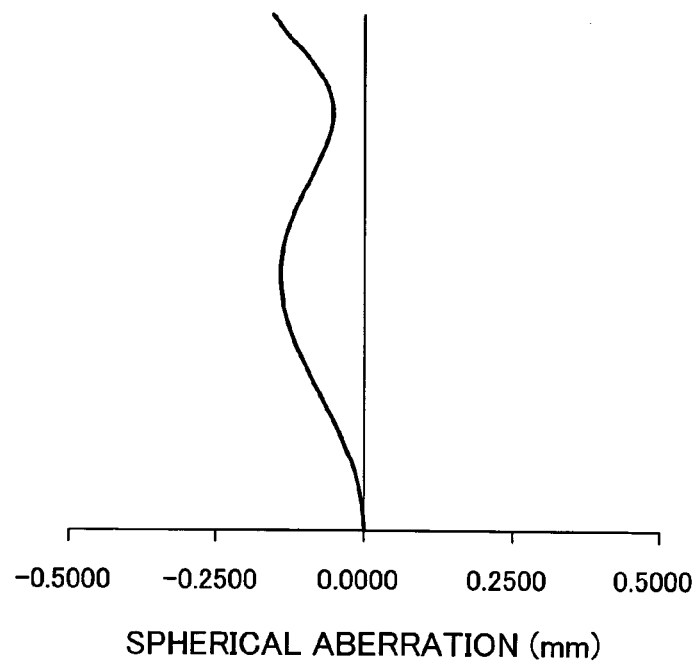
FIG. 33 is a graph illustrating a spherical aberration of Example 5 (wavelength: 660 nm, thickness of cover layer 3P: 0.6 mm).

FIG. 33 shows a spherical aberration of Example 5 (wavelength: 660 nm, thickness of the cover layer 3P: 0.6 mm).

Figure 34:
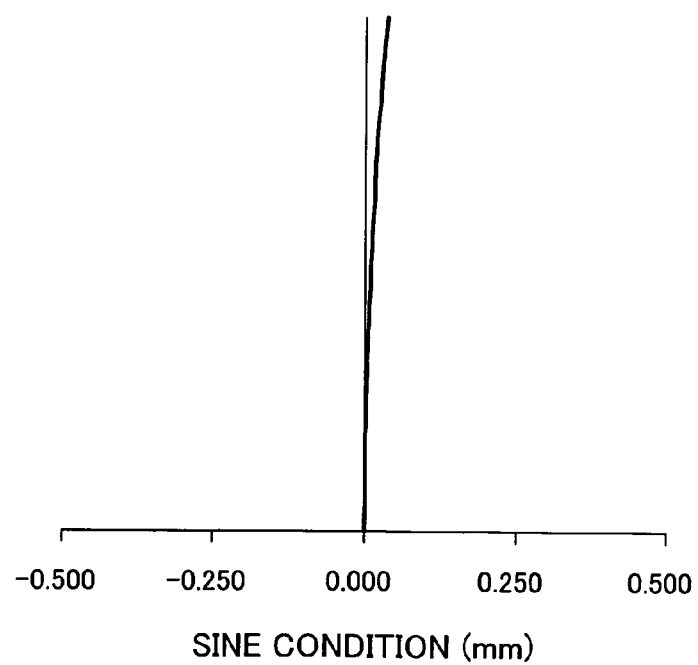
FIG. 34 is a graph illustrating an offence against the sine condition of Example 5 (wavelength: 660 nm, thickness of cover layer 3P: 0.6 mm).

FIG. 34 shows an offence against the sine condition of Example 5 (wavelength: 660 nm, thickness of the cover layer 3P: 0.6 mm).

Figure 35:
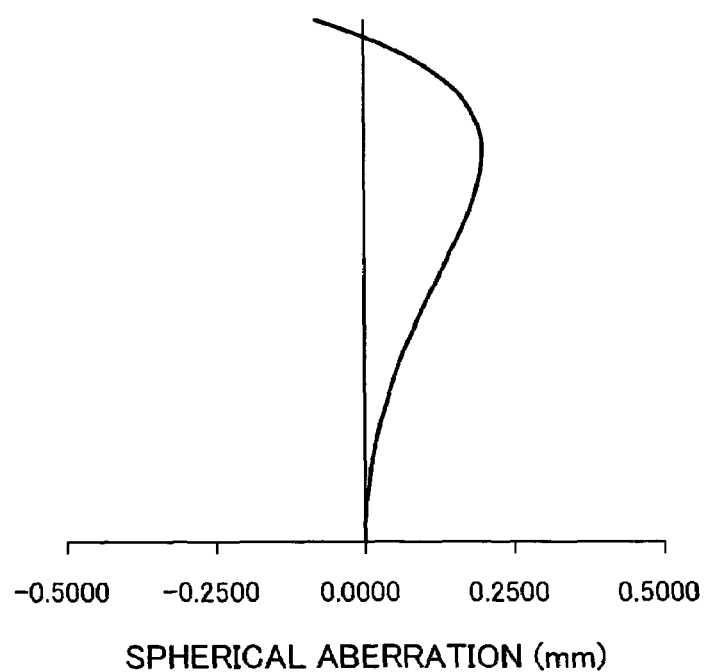
FIG. 35 is a graph illustrating a spherical aberration of Example 5 (wavelength: 780 nm, thickness of cover layer 3P: 1.2 mm).

FIG. 35 shows a spherical aberration of Example 5 (wavelength: 780 nm, thickness of the cover layer 3P: 1.2 mm).

Figure 36:
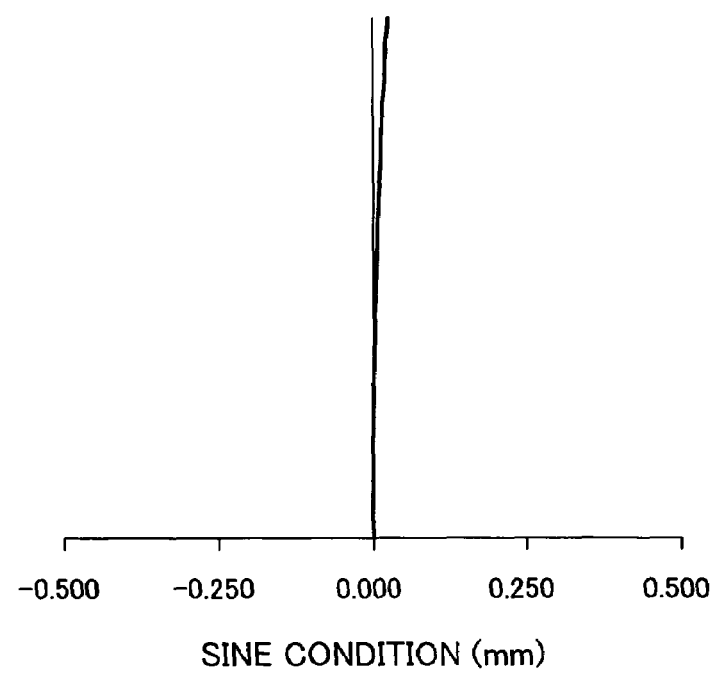
FIG. 36 is a graph illustrating an offence against the sine condition of Example 5 (wavelength: 780 nm, thickness of cover layer 3P: 1.2 mm).

FIG. 36 shows an offence against the sine condition of Example 5 (wavelength: 780 nm, thickness of the cover layer 3P: 1.2 mm).

Table 24 shows the aberration with respect to an on-axis incident light beam and Table 25 shows the aberration with respect to a 0.5 degree off-axis light beam.

TABLE 24

|     | RMS  | THIRD-ORDER SPHERICAL | FIFTH-ORDER SPHERICAL | HIGHER ORDER |
|-----|------|-----------------------|-----------------------|--------------|
| BD  | 21.9 | 14.9                  | −5.7                  | 15.0         |
| DVD | 34.0 | −4.6                  | −33.1                 | 9.2          |
| CD  | 69.6 | −69.3                 | −15.2                 | 0.5          |

TABLE 25

|     | RMS  | THIRD-ORDER COMA | FIFTH-ORDER COMA | (UNIT: mλ) HIGHER ORDER |
|-----|------|------------------|------------------|-------------------------|
| BD  | 55.1 | 41.1             | 22.5             | 19.2                    |
| DVD | 79.1 | 72.0             | 3.7              | 9.3                     |
| CD  | 76.0 | 32.0             | 0.0              | 0.5                     |

In Example 5, $|SC_{MAX}|$ in the region where the light beam passes through was:

BD: 0.011
DVD: 0.036
CD: 0.025

Example 6

FIG. 12 is a schematic ray diagram of an objective optical system 2 of Example 6 used in an optical pickup 1 where a laser beam of 408 nm wavelength is used.

FIG. 13 is a schematic ray diagram of the objective optical system 2 of Example 6 used in the optical pickup 1 where a laser beam of 660 nm wavelength is used.

FIG. 14 is a schematic ray diagram of the objective optical system 2 of Example 6 used in the optical pickup 1 where a laser beam of 780 nm wavelength is used.

Example 6 is a numeric embodiment of the objective optical system of Specific Configuration 5 described above.

Tables 26 to 29 show specific numeric values of Example 6.

TABLE 26

|                                                   | BD    | DVD  | CD   |
|---------------------------------------------------|-------|------|------|
| WAVELENGTH (nm)                                   | 408   | 660  | 780  |
| DIAMETER OF ENTRANCE PUPIL OF OBJECTIVE LENS 10 (APERTURE) | 3.3   | 2.5  | 1.95 |
| NA                                                | 0.85  | 0.6  | 0.47 |
| WORKING DISTANCE (WD) (mm)                        | 0.6   | 0.4  | 0.1  |
| DISC THICKNESS (DT) (mm)                          | 0.085 | 0.6  | 1.2  |

TABLE 27

| SURFACE NUMBER | RADIUS OF CURVATURE AT VERTEX (mm) | THICKNESS (mm) | REFRACTIVE INDEX OF MATERIAL | REMARKS |
|----------------|------------------------------------|----------------|-------------------------------|---------|
| #0             | ∞                                  | ∞              | Air                           |         |
| #1             | −9.92927                           | 1.00000        | n1                            | DIFFRACTION SURFACE |
| #2             | −7.47266                           | 0.20000        | Air                           | DIFFRACTION SURFACE |
| #3             | 1.58065                            | 2.43396        | n2                            | ASPHERICAL SURFACE |
| #4             | −31.11271                          | WD             |                               | ASPHERICAL SURFACE |
| #5             | ∞                                  | DT             | disc                          |         |
| #6             | ∞                                  |                |                               |         |

TABLE 28

|      | WAVELENGTH (nm) |          |          |
|------|-----------------|----------|----------|
|      | 780             | 660      | 408      |
| n1   | 1.501968        | 1.504954 | 1.522855 |
| n2   | 1.739003        | 1.744849 | 1.777719 |
| disk | 1.572207        | 1.578152 | 1.616416 |

TABLE 29

| | #1 | | | | #2 | | |
|---|---|---|---|---|---|---|---|
| | ASPHERICAL COEFFICIENT | | PHASE FUNCTION COEFFICIENT | | ASPHERICAL COEFFICIENT | | PHASE FUNCTION COEFFICIENT |
| RD | −9.929266 | P2 | $3.124528 \times 10^1$ | RD | −7.472662 | P2 | $1.351800 \times 10^2$ |
| CC | 9.341656 | P4 | $−4.262839 \times 10^1$ | CC | 0.000000 | P4 | 1.894232 |
| A4 | $−2.483637 \times 10^{-3}$ | P6 | −5.632894 | A4 | $2.102097 \times 10^{-3}$ | P6 | 4.021827 |
| A6 | $3.373257 \times 10^{-4}$ | P8 | $−9.954307 \times 10^{-1}$ | A6 | $−3.400990 \times 10^{-4}$ | P8 | 1.255812 |
| A8 | $−2.047251 \times 10^{-4}$ | P10 | 0.000000 | A8 | $6.393528 \times 10^{-5}$ | P10 | 0.000000 |
| A10 | $−3.753406 \times 10^{-7}$ | P12 | 0.000000 | A10 | $−3.766637 \times 10^{-5}$ | P12 | 0.000000 |
| A12 | 0.000000 | P14 | 0.000000 | A12 | 0.000000 | P14 | 0.000000 |
| A14 | 0.000000 | P16 | 0.000000 | A14 | 0.000000 | P16 | 0.000000 |
| A16 | 0.000000 | P18 | 0.000000 | A16 | 0.000000 | | |

| | #3 ASPHERICAL COEFICIENT | | #4 ASPHERICAL COEFFICIENT |
|---|---|---|---|
| RD | 1.580650 | RD | $−3.111271 \times 10^{-1}$ |
| CC | $−4.201021 \times 10^{-1}$ | CC | 0.000000 |
| A4 | $3.679823 \times 10^{-4}$ | A4 | $1.252100 \times 10^{-1}$ |
| A6 | $−3.314383 \times 10^{-4}$ | A6 | $−1.501588 \times 10^{-1}$ |
| A8 | $2.353649 \times 10^{-4}$ | A8 | $1.113056 \times 10^{-2}$ |
| A10 | $−1.116006 \times 10^{-4}$ | A10 | $9.254931 \times 10^{-2}$ |
| A12 | $−1.221845 \times 10^{-4}$ | A12 | $−6.771517 \times 10^{-2}$ |
| A14 | $8.575418 \times 10^{-5}$ | A14 | $1.291899 \times 10^{-2}$ |
| A16 | $−2.310863 \times 10^{-5}$ | A16 | $1.529451 \times 10^{-3}$ |

Figure 37:
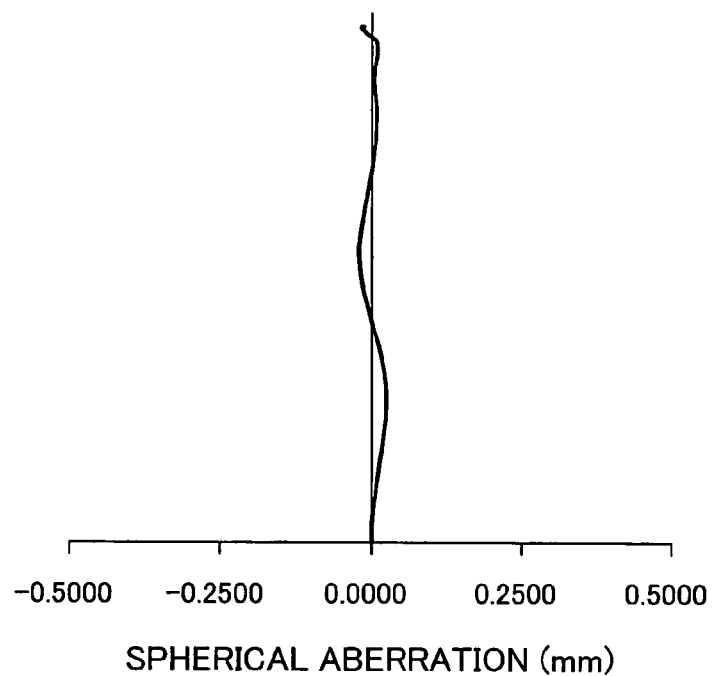
FIG. 37 is a graph illustrating a spherical aberration of Example 6 (wavelength: 408 nm, thickness of cover layer 3P: 0.085 mm).

FIG. 37 shows a spherical aberration of Example 6 (wavelength: 408 nm, thickness of the cover layer 3P: 0.085 mm).

Figure 38:
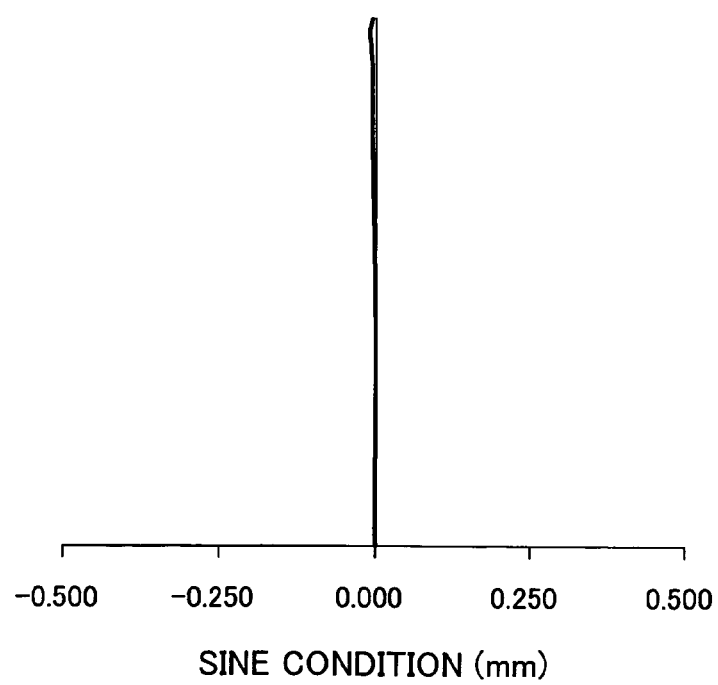
FIG. 38 is a graph illustrating an offence against the sine condition of Example 6 (wavelength: 408 nm, thickness of cover layer 3P: 0.085 mm).

FIG. 38 shows an offence against the sine condition of Example 6 (wavelength: 408 nm, thickness of the cover layer 3P: 0.085 mm).

Figure 39:
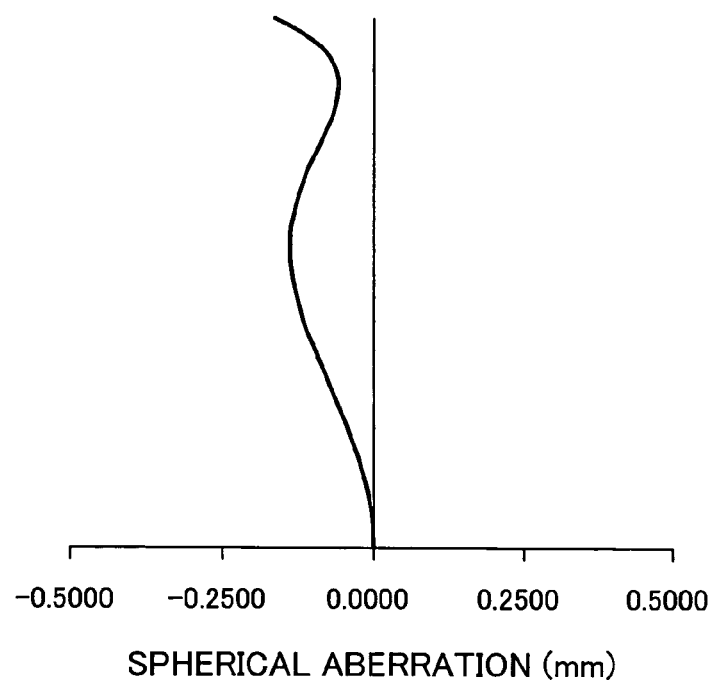
FIG. 39 is a graph illustrating a spherical aberration of Example 6 (wavelength: 660 nm, thickness of cover layer 3P: 0.6 mm).

FIG. 39 shows a spherical aberration of Example 6 (wavelength: 660 nm, thickness of the cover layer 3P: 0.6 mm).

Figure 40:
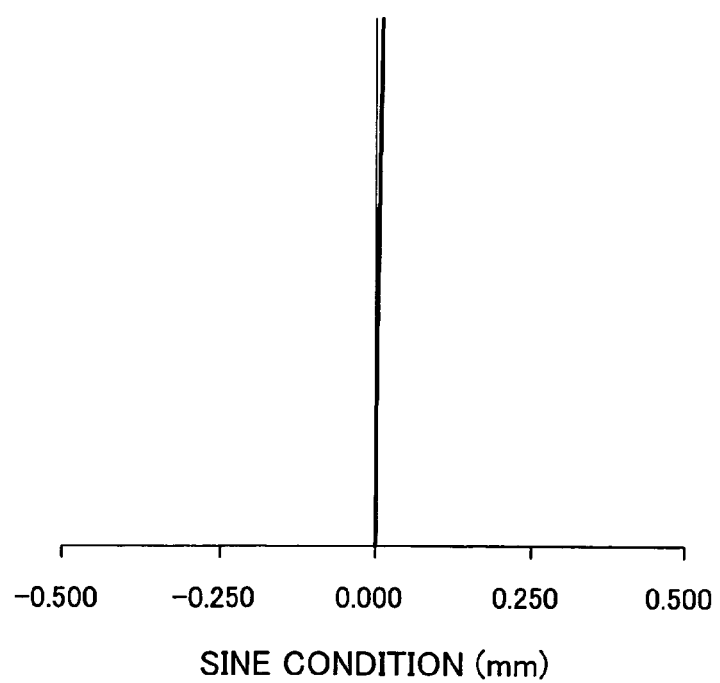
FIG. 40 is a graph illustrating an offence against the sine condition of Example 6 (wavelength: 660 nm, thickness of cover layer 3P: 0.6 mm).

FIG. 40 shows an offence against the sine condition of Example 6 (wavelength: 660 nm, thickness of the cover layer 3P: 0.6 mm).

Figure 41:
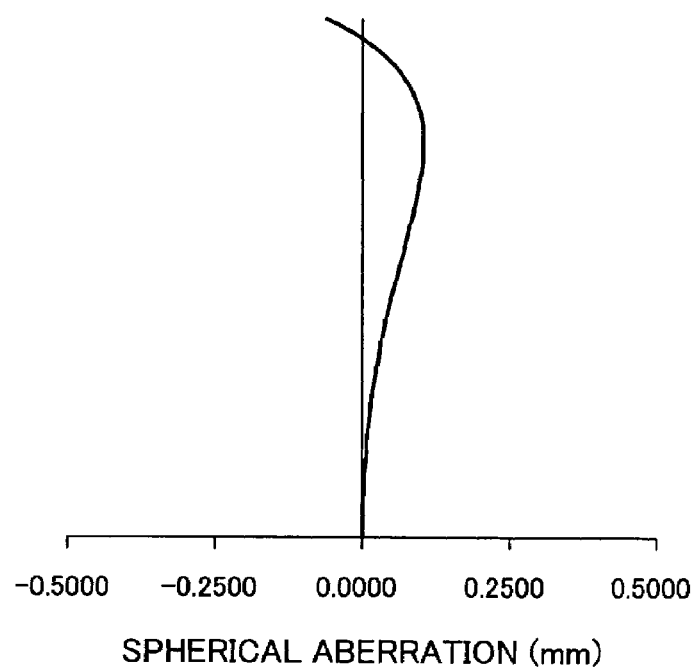
FIG. 41 is a graph illustrating a spherical aberration of Example 6 (wavelength: 780 nm, thickness of cover layer 3P: 1.2 mm).

FIG. 41 shows a spherical aberration of Example 6 (wavelength: 780 nm, thickness of the cover layer 3P: 1.2 mm).

Figure 42:
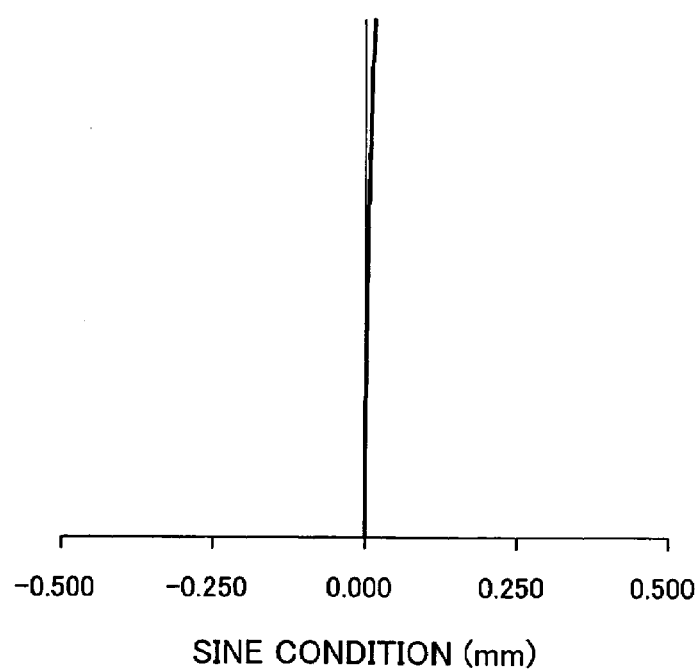
FIG. 42 is a graph illustrating an offence against the sine condition of Example 6 (wavelength: 780 nm, thickness of cover layer 3P: 1.2 mm).

FIG. 42 shows an offence against the sine condition of Example 6 (wavelength: 780 nm, thickness of the cover layer 3P: 1.2 mm).

Table 30 shows the aberration with respect to an on-axis incident light beam and Table 31 shows the aberration with respect to a 0.5 degree off-axis light beam.

TABLE 30

| | RMS | THIRD-ORDER SPHERICAL | FIFTH-ORDER SPHERICAL | (UNIT: mλ) HIGHER ORDER |
|---|---|---|---|---|
| BD | 11.8 | 6.8 | −6.5 | 6.9 |
| DVD | 33.6 | 11.1 | −31.6 | 4.0 |
| CD | 39.0 | −38.2 | −11.4 | 0.9 |

TABLE 31

| | RMS | THIRD-ORDER COMA | FIFTH-ORDER COMA | (UNIT: mλ) HIGHER ORDER |
|---|---|---|---|---|
| BD | 44.6 | −35.3 | 9.0 | 10.7 |
| DVD | 37.9 | 15.6 | −2.6 | 4.0 |
| CD | 42.8 | 18.6 | −0.7 | 0.9 |

In Example 6, $|SC_{MAX}|$ in the region where the light beam passes through was:
BD: 0.010
DVD: 0.011
CD: 0.015.

INDUSTRIAL APPLICABILITY

As described above, the present invention is useful for optical recording/reproducing devices, such as those for computers, capable of recording and reproducing information on and from various optical information recording media based on different standards (e.g., two or more of CD (compact disc), DVD (digital versatile disc), EVD (enhanced versatile disc), BD (blu-ray disc) and HD-DVD (high definition digital versatile disc)).

The invention claimed is:

1. An optical pickup which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the optical pickup focusing a laser beam on a certain optical information recording surface corresponding thereto, and the optical pickup comprising:

a light source capable of emitting laser beams of different wavelengths corresponding to the optical information recording surfaces, respectively; and an objective optical system for focusing any laser beam emitted from the light source on a certain optical information recording surface corresponding thereto, wherein:

the objective optical system includes at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, the optical pickup satisfies the following condition (1) for every wavelength of the corresponding laser beams:

$$|SC_{MAX}|<0.036 \qquad (1)$$

wherein $SC_{MAX}$ is the maximum value of an offence against the sine condition of the objective optical system defined by the following formula (2):

$$\{(h/\sin U)-f\}/f \qquad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens, f is a focal distance of the objective optical system, and the optical pickup further satisfies the following formula (3) for every wavelength of the corresponding laser beams:

$$0.8<\phi_0/\phi_T<1.2 \qquad (3)$$

wherein $\phi_0$ is a power of the objective lens and $\phi_T$ is a power of the objective optical system.

2. An optical pickup which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the optical pickup focusing a laser beam on a certain optical information recording surface corresponding thereto, and the optical pickup comprising:

a light source capable of emitting laser beams of different wavelengths corresponding to the optical information recording surfaces, respectively; and an objective optical system for focusing any laser beam emitted from the light source on a certain optical information recording surface corresponding thereto, wherein:

the objective optical system includes at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, the optical pickup satisfies the following condition (1) for every wavelength of the corresponding laser beams:

$$|SC_{MAX}|<0.036 \qquad (1)$$

wherein $SC_{MAX}$ is the maximum value of an offence against the sine condition of the objective optical system defined by the following formula (2):

$$\{(h/\sin U)-f\}/f \qquad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens, f is a focal distance of the objective optical system, and the optical pickup further satisfies the following formula (4) for every wavelength of the corresponding laser beams:

$$0 \leq \phi_C/\phi_T<1.2 \qquad (4)$$

wherein $\phi_C$ is a combined power of the wavefront conversion surfaces and $\phi_T$ is a power of the objective optical system.

3. An optical pickup which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the optical pickup focusing a laser beam on a certain optical information recording surface corresponding thereto, and the optical pickup comprising:

a light source capable of emitting laser beams of different wavelengths corresponding to the optical information recording surfaces, respectively; and an objective optical system for focusing any laser beam emitted from the light source on a certain optical information recording surface corresponding thereto, wherein:

the objective optical system includes at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, the optical pickup satisfies the following condition (1) for every wavelength of the corresponding laser beams:

$$|SC_{MAX}|<0.036 \qquad (1)$$

wherein $SC_{MAX}$ is the maximum value of an offence against the sine condition of the objective optical system defined by the following formula (2):

$$\{(h/\sin U)-f\}/f \qquad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens f is a focal distance of the objective optical system, and the optical pickup further satisfies the following formula (5) for every wavelength of the corresponding laser beams:

$$0 \leq \Delta|\phi_C/\phi_T|/\Delta\lambda 1.2 \qquad (5)$$

wherein $\phi_C$ is a combined power of the wavefront conversion surfaces, $\phi_T$ is a power of the objective optical system, $\Delta|\phi_C/\phi_T|$ is a variation in power and $\Delta\lambda$ is a variation in wavelength (μm).

4. An optical pickup which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the optical pickup focusing a laser beam on a certain optical information recording surface corresponding thereto, and the optical pickup comprising:

a light source capable of emitting laser beams of different wavelengths corresponding to the optical information recording surfaces, respectively; and an objective optical system for focusing any laser beam emitted from the light source on a certain optical information recording surface corresponding thereto, wherein:

the objective optical system includes at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, the optical pickup satisfies the following condition (1) for every wavelength of the corresponding laser beams:

$$|SC_{MAX}| < 0.036 \quad (1)$$

wherein $SC_{MAX}$ is the maximum value of an offence against the sine condition of the objective optical system defined by the following formula (2):

$$\{(h/\sin U) - f\}/f \quad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens, f is a focal distance of the objective optical system, and the optical pickup further satisfies the following formula (6) for every wavelength of the corresponding laser beams:

$$\phi_1 \cdot \phi_2 \leq 0 \quad (6)$$

wherein $\phi_1$ is a power of one of the wavefront conversion surfaces and $\phi_2$ is a power of the other wavefront conversion surface.

5. An optical pickup which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the optical pickup focusing a laser beam on a certain optical information recording surface corresponding thereto, and the optical pickup comprising:

a light source capable of emitting laser beams of different wavelengths corresponding to the optical information recording surfaces, respectively; and an objective optical system for focusing any laser beam emitted from the light source on a certain optical information recording surface corresponding thereto, wherein:

the objective optical system includes at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, the optical pickup satisfies the following condition (1) for every wavelength of the corresponding laser beams:

$$|SC_{MAX}| < 0.036 \quad (1)$$

wherein $SC_{MAX}$ is the maximum value of an offence against the sine condition of the objective optical system defined by the following formula (2):

$$\{(h/\sin U) - f\}/f \quad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens, f is a focal distance of the objective optical system, and wherein the at least two wavefront conversion surfaces do not convert a wavefront of a laser beam having a wavelength corresponding to at least one of the optical information recording media.

6. An objective optical system which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the objective optical system being used for focusing a laser beam on a certain optical information recording surface corresponding thereto, and the objective optical system comprising:

at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, wherein:

the objective optical system satisfies the following condition (1) for every wavelength of the corresponding laser beams:

$$|SC_{MAX}| < 0.036 \quad (1)$$

wherein $SC_{MAX}$ is the maximum value of an offence against the sine condition of the objective optical system defined by the following formula (2):

$$\{(h/\sin U) - f\}/f \quad (2)$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system, and the objective optical system further satisfies the following formula (3) for every wavelength of the corresponding laser beams:

$$0.8 < \phi_C/\phi_T < 1.2 \quad (3)$$

wherein $\phi_C$ is a power of the objective lens and $\phi_T$ is a power of the objective optical system.

7. An objective optical system which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the objective optical system being used for focusing a laser beam on a certain optical information recording surface corresponding thereto, and the objective optical system comprising:

at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, wherein:

the objective optical system satisfies the following condition (1) for every wavelength of the corresponding laser beams:

$$|SC_{MAX}| < 0.036 \tag{1}$$

wherein $SC_{MAX}$ is the maximum value of an offence against the sine condition of the objective optical system defined by the following formula (2):

$$\{(h/\sin U) - f\}/f \tag{2}$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system, and the objective optical system further satisfies the following formula (4) for every wavelength of the corresponding laser beams:

$$0 \leq \phi_C/\phi_T < 1.2 \tag{4}$$

wherein $\phi_C$ is a combined power of the wavefront conversion surfaces and $\phi_T$ is a power of the objective optical system.

8. An objective optical system which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the objective optical system being used for focusing a laser beam on a certain optical information recording surface corresponding thereto, and the objective optical system comprising:

at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, wherein:

the objective optical system satisfies the following condition (1) for every wavelength of the corresponding laser beams:

$$|SC_{MAX}| < 0.036 \tag{1}$$

wherein $SC_{MAX}$ is the maximum value of an offence against the sine condition of the objective optical system defined by the following formula (2):

$$\{(h/\sin U) - f\}/f \tag{2}$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system, and the objective optical system further satisfies the following formula (5) for every wavelength of the corresponding laser beams:

$$0 \leq \Delta|\phi_C|/\Delta\lambda < 1.2 \tag{5}$$

wherein $\phi_C$ is a combined power of the wavefront conversion surfaces, $\phi_T$ is a power of the objective optical system, $\Delta|\phi_C|/\phi_T$ is a variation in power and $\Delta\lambda$ is a variation in wavelength (μm).

9. An objective optical system which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the objective optical system being used for focusing a laser beam on a certain optical information recording surface corresponding thereto, and the objective optical system comprising:

at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, wherein:

the objective optical system satisfies the following condition (1) for every wavelength of the corresponding laser beams:

$$|SC_{MAX}| < 0.036 \tag{1}$$

wherein $SC_{MAX}$ is the maximum value of an offence against the sine condition of the objective optical system defined by the following formula (2):

$$\{(h/\sin U) - f\}/f \tag{2}$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system, and the objective optical system further satisfies the following formula (6) for every wavelength of the corresponding laser beams:

$$\phi_1 \cdot \phi_x \leq 0 \tag{6}$$

wherein $\phi_1$ is a power of one of the wavefront conversion surfaces and $\phi_2$ is a power of the other wavefront conversion surface.

10. An objective optical system which is applicable to different kinds of optical information recording media having optical information recording surfaces and cover layers for protecting the optical information recording surfaces, respectively, and being different from each other in at least one of a wavelength of a laser beam corresponding to the optical information recording surface and a thickness of the cover layer, the objective optical system being used for focusing a laser beam on a certain optical information recording surface corresponding thereto, and the objective optical system comprising:

at least two wavefront conversion surfaces for converting a wavefront of a laser beam entered therein into a different wavefront in response to the kind of the optical information recording medium corresponding to the laser beam and an objective lens for focusing the laser beam passed through the wavefront converting surfaces on the certain optical information recording surface, wherein:

the objective optical system satisfies the following condition (F) for every wavelength of the corresponding laser beams:

$$|SC_{MAX}| < 0.036 \tag{1}$$

wherein $SC_{MAX}$ is the maximum value of an offence against the sine condition of the objective optical system defined by the following formula (2):

$$\{(h/\sin U) - f\}/f \tag{2}$$

wherein h is a distance between the laser beam entering the objective lens and an optical axis of the objective lens, U is an angle formed between the optical axis and the travel direction of the laser beam entered the objective lens at the distance h from the optical axis and passed through the objective lens and f is a focal distance of the objective optical system, and wherein the at least two wavefront conversion surfaces do not convert a wavefront of a laser beam having a wavelength corresponding to at least one of the optical information recording media.

* * * * *